US008489477B2

(12) United States Patent  (10) Patent No.: US 8,489,477 B2
Rentala et al.  (45) Date of Patent: Jul. 16, 2013

(54) PREPAID ACCOUNT PRODUCT PEER SCORING

(75) Inventors: Cindy Rentala, Rye, NY (US); Donaya Luangchotikul, Belmont, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 263 days.

(21) Appl. No.: 12/691,622

(22) Filed: Jan. 21, 2010

(65) Prior Publication Data

US 2010/0185536 A1    Jul. 22, 2010

Related U.S. Application Data

(60) Provisional application No. 61/146,573, filed on Jan. 22, 2009.

(51) Int. Cl.
    *G06Q 40/00*    (2012.01)
(52) U.S. Cl.
    USPC ............................................. 705/35; 705/39
(58) Field of Classification Search
    None
    See application file for complete search history.

(56) References Cited

U.S. PATENT DOCUMENTS

| | | | |
|---|---|---|---|
| 6,968,316 B1 | 11/2005 | Hamilton | |
| 6,999,943 B1 * | 2/2006 | Johnson et al. | 705/39 |
| 7,392,224 B1 * | 6/2008 | Bauer et al. | 705/41 |
| 7,630,937 B1 * | 12/2009 | Mo et al. | 705/39 |
| 7,860,789 B2 * | 12/2010 | Hirka et al. | 705/39 |
| 7,877,325 B2 * | 1/2011 | Bishop et al. | 705/39 |
| 8,010,429 B2 * | 8/2011 | Anderson | 705/35 |
| 2003/0088460 A1 | 5/2003 | Riordan et al. | |
| 2005/0021492 A1 | 1/2005 | Safaei et al. | |
| 2006/0282359 A1 * | 12/2006 | Nobili et al. | 705/35 |
| 2006/0282432 A1 * | 12/2006 | Cassidy et al. | 707/7 |
| 2007/0050201 A1 * | 3/2007 | Gardner et al. | 705/1 |
| 2007/0118449 A1 * | 5/2007 | De La Motte | 705/35 |
| 2007/0288371 A1 * | 12/2007 | Johnson | 705/41 |
| 2008/0306790 A1 * | 12/2008 | Otto et al. | 705/7 |
| 2009/0089122 A1 * | 4/2009 | Koukis | 705/7 |

OTHER PUBLICATIONS

Schneider, Rachel. "One Size Does Not Fit All: A Comparison of Monthly Financial Services Spending," mimeo, Center for Financial Services Innovation (2009).*

* cited by examiner

*Primary Examiner* — Ryan Zeender
*Assistant Examiner* — Dana Amsdell
(74) *Attorney, Agent, or Firm* — Cooley LLP; Walter G. Hanchuk

(57) ABSTRACT

Data from transactions conducted on prepaid accounts are accumulated for an issuer and its peers. The accumulated data is used for calculations for both the issuer and its peers to make comparison therebetween. The comparisons between the issuer and its peers are rendered graphically in a report. The issuers are in an open system payment processing network that includes merchants and their acquirers, and a transaction handler for authorizing, clearing and settling the transactions that are conducted on prepaid accounts.

20 Claims, 34 Drawing Sheets

I. ATM/Debit Cards For Checking Accounts Score — 100

Number of Checking Accounts × Penetration × Active Accounts as % of Total Accounts × Average Transactions Per Account = B = ATM/Debit Card Transaction Quantity Score Number of Checking Accounts × Penetration × Active Accounts as % of Total Accounts × Average Transactions Per Account = B × Average Transaction Amount = F = ATM/Debit Card Currency Quantity Score
— 102

II. Prepaid Accounts Score

— 114

Active Accounts as % of Total Accounts = A × Average Transactions Per Account = B = Prepaid Account Transaction Quantity Score = C — 104

— 116

Active Accounts as % of Total Accounts = A × Average Transactions Per Account = B × Average Transaction Amount = D = Prepaid Account Currency Quantity Score = E — 108

— 118

| | A | B | C | D | E | F | G |
|---|---|---|---|---|---|---|---|
| 1 | Visa Prepaid Scorecard | | | | | | |
| 2 | Participant Opportunity Summary | | | | | | |
| 3 | | | | | | | |
| 4 | | | | | | | |
| 5 | | Metric | Participant | Peer Group Average | Best-In-Class | Opportunity to Peer Group Average | Opportunity to Best-In-Class |
| 6 | 1 | Activation | 50% | 80% | 90% | $1,080,000,000 | $1,440,000,000 |
| 7 | 2 | Usage | 15.0 | 12.0 | 20.0 | N/A | $600,000,000 |
| 8 | 3 | Auth Rate | 70% | 85% | 90% | $385,714,286 | $514,285,714 |
| 9 | | | | | | | |
| 10 | | | | | | | |
| 11 | | | | | | | |
| 12 | | | | | | | |
| 13 | | | | | | | |
| 14 | | | | | | | |
| 15 | | | | | | | |

*Fig. 4*

| Volume Metrics | | | | Issuer Name | Peer Rank | +/(-) Same Qtr. of Prior Year | | | | # of Issuers in Peer Group | Peer Group Average * | Peer Group Best in Class |
|---|---|---|---|---|---|---|---|---|---|---|---|---|
| Amount ($MM) | | | | | | | | | | | | |
| Offline | * | * | * | $XXX | A | $YYY | * | * | * | n | $XXX | $XXX |
| Interlink | * | * | * | $XXX | A | $YYY | * | * | * | n | $XXX | $XXX |
| Payments Volume | * | * | * | $XXX | A | $YYY | * | * | * | n | $XXX | $XXX |
| ATM Cash | * | * | * | $XXX | A | $YYY | * | * | * | n | $XXX | $XXX |
| Manual Cash | * | * | * | $XXX | A | $YYY | * | * | * | n | $XXX | $XXX |
| Cashback | * | * | * | $XXX | A | $YYY | * | * | * | n | $XXX | $XXX |
| Total Cash Volume | * | * | * | $XXX | A | $YYY | * | * | * | n | $XXX | $XXX |
| Total Volume (Payments + Cash) | * | * | * | $XXX | A | $YYY | * | * | * | n | $XXX | $XXX |
| % Share of Total Prepaid Product X Volume | | | | | | | | | | | | |
| Offline | * | * | * | xx.x% | A | yy.y% | * | * | * | n | xx.x% | xx.x% |
| Interlink | * | * | * | xx.x% | A | yy.y% | * | * | * | n | xx.x% | xx.x% |
| Payments Volume | * | * | * | xx.x% | A | yy.y% | * | * | * | n | xx.x% | xx.x% |
| ATM Cash | * | * | * | xx.x% | A | yy.y% | * | * | * | n | xx.x% | xx.x% |
| Manual Cash | * | * | * | xx.x% | A | yy.y% | * | * | * | n | xx.x% | xx.x% |
| Cashback | * | * | * | xx.x% | A | yy.y% | * | * | * | n | xx.x% | xx.x% |
| Total Cash Volume | * | * | * | xx.x% | A | yy.y% | * | * | * | n | xx.x% | xx.x% |
| Total Volume (Payments + Cash) | * | * | * | xx.x% | A | yy.y% | * | * | * | n | xx.x% | xx.x% |
| % YoY Quarterly Volume Growth | | | | | | | | | | | | |
| Offline | * | * | * | xx.x% | A | yy.y% | * | * | * | n | xx.x% | xx.x% |
| Interlink | * | * | * | xx.x% | A | yy.y% | * | * | * | n | xx.x% | xx.x% |
| Payments Volume | * | * | * | xx.x% | A | yy.y% | * | * | * | n | xx.x% | xx.x% |
| ATM Cash | * | * | * | xx.x% | A | yy.y% | * | * | * | n | xx.x% | xx.x% |
| Manual Cash | * | * | * | xx.x% | A | yy.y% | * | * | * | n | xx.x% | xx.x% |
| Cashback | * | * | * | xx.x% | A | yy.y% | * | * | * | n | xx.x% | xx.x% |
| Total Cash Volume | * | * | * | xx.x% | A | yy.y% | * | * | * | n | xx.x% | xx.x% |
| Total Volume (Payments + Cash) | * | * | * | xx.x% | A | yy.y% | * | * | * | n | xx.x% | xx.x% |
| % Quarterly Volume Growth Contribution | | | | | | | | | | | | |
| Offline | * | * | * | xx.x% | A | yy.y% | * | * | * | n | xx.x% | xx.x% |
| Interlink | * | * | * | xx.x% | A | yy.y% | * | * | * | n | xx.x% | xx.x% |
| Payments Volume | * | * | * | xx.x% | A | yy.y% | * | * | * | n | xx.x% | xx.x% |
| ATM Cash | * | * | * | xx.x% | A | yy.y% | * | * | * | n | xx.x% | xx.x% |
| Manual Cash | * | * | * | xx.x% | A | yy.y% | * | * | * | n | xx.x% | xx.x% |
| Cashback | * | * | * | xx.x% | A | yy.y% | * | * | * | n | xx.x% | xx.x% |
| Total Cash Volume | * | * | * | xx.x% | A | yy.y% | * | * | * | n | xx.x% | xx.x% |
| Total Volume (Payments + Cash) | * | * | * | xx.x% | A | yy.y% | * | * | * | n | xx.x% | xx.x% |

*Fig. 5*

| Transaction Metrics | | | | Issuer Name | Peer Rank | +/(-) Same Qtr. of Prior Year | | | | # of Issuers in Peer Group | Peer Group Average* | Peer Group Best in Class |
|---|---|---|---|---|---|---|---|---|---|---|---|---|
| Transaction Count ('000) | | | | | | | | | | | | |
| Offline | * | * | * | xxx | A | yyy | * | * | * | n | xxx | xxx |
| Interlink | * | * | * | xxx | A | yyy | * | * | * | n | xxx | xxx |
| Payments Transactions | * | * | * | xxx | A | yyy | * | * | * | n | xxx | xxx |
| ATM Cash | * | * | * | xxx | A | yyy | * | * | * | n | xxx | xxx |
| Manual Cash | * | * | * | xxx | A | yyy | * | * | * | n | xxx | xxx |
| Total Cash Transactions | * | * | * | xxx | A | yyy | * | * | * | n | xxx | xxx |
| Total Transactions (Payments + Cash) | * | * | * | xxx | A | yyy | * | * | * | n | xxx | xxx |
| % Share of Total Prepaid Product: X Transactions | | | | | | | | | | | | |
| Offline | * | * | * | xx.x% | A | yy.y% | * | * | * | n | xx.x% | xx.x% |
| Interlink | * | * | * | xx.x% | A | yy.y% | * | * | * | n | xx.x% | xx.x% |
| Payments Transactions | * | * | * | xx.x% | A | yy.y% | * | * | * | n | xx.x% | xx.x% |
| ATM Cash | * | * | * | xx.x% | A | yy.y% | * | * | * | n | xx.x% | xx.x% |
| Manual Cash | * | * | * | xx.x% | A | yy.y% | * | * | * | n | xx.x% | xx.x% |
| Total Cash Transactions | * | * | * | xx.x% | A | yy.y% | * | * | * | n | xx.x% | xx.x% |
| Total Transactions (Payments + Cash) | * | * | * | xx.x% | A | yy.y% | * | * | * | n | xx.x% | xx.x% |
| % YoY Quarterly Transaction Growth | | | | | | | | | | | | |
| Offline | * | * | * | xx.x% | A | yy.y% | * | * | * | n | xx.x% | xx.x% |
| Interlink | * | * | * | xx.x% | A | yy.y% | * | * | * | n | xx.x% | xx.x% |
| Payments Transactions | * | * | * | xx.x% | A | yy.y% | * | * | * | n | xx.x% | xx.x% |
| ATM Cash | * | * | * | xx.x% | A | yy.y% | * | * | * | n | xx.x% | xx.x% |
| Manual Cash | * | * | * | xx.x% | A | yy.y% | * | * | * | n | xx.x% | xx.x% |
| Total Cash Transactions | * | * | * | xx.x% | A | yy.y% | * | * | * | n | xx.x% | xx.x% |
| Total Transactions (Payments + Cash) | * | * | * | xx.x% | A | yy.y% | * | * | * | n | xx.x% | xx.x% |
| % Quarterly Transaction Growth Contribution | | | | | | | | | | | | |
| Offline | * | * | * | xx.x% | A | yy.y% | * | * | * | n | xx.x% | xx.x% |
| Interlink | * | * | * | xx.x% | A | yy.y% | * | * | * | n | xx.x% | xx.x% |
| Payments Transactions | * | * | * | xx.x% | A | yy.y% | * | * | * | n | xx.x% | xx.x% |
| ATM Cash | * | * | * | xx.x% | A | yy.y% | * | * | * | n | xx.x% | xx.x% |
| Manual Cash | * | * | * | xx.x% | A | yy.y% | * | * | * | n | xx.x% | xx.x% |
| Total Cash Transactions | * | * | * | xx.x% | A | yy.y% | * | * | * | n | xx.x% | xx.x% |
| Total Transactions (Payments + Cash) | * | * | * | xx.x% | A | yy.y% | * | * | * | n | xx.x% | xx.x% |

| Volume & Interchange Measurements | | | | Issuer Name | Peer Rank | +/(-) Same Qtr. of Prior Year | | | | # of Issuers in Peer Group | Peer Group Average * | Peer Group Best in Class |
|---|---|---|---|---|---|---|---|---|---|---|---|---|
| Average Ticket ($) | | | | | | | | | | | | |
| Offline | * | * | * | $XXX | A | $YYY | * | * | * | n | $XXX | $XXX |
| Interlink | * | * | * | $XXX | A | $YYY | * | * | * | n | $XXX | $XXX |
| Payments | * | * | * | $XXX | A | $YYY | * | * | * | n | $XXX | $XXX |
| ATM Cash | * | * | * | $XXX | A | $YYY | * | * | * | n | $XXX | $XXX |
| Manual Cash | * | * | * | $XXX | A | $YYY | * | * | * | n | $XXX | $XXX |
| Total Cash | * | * | * | $XXX | A | $YYY | * | * | * | n | $XXX | $XXX |
| Total (Payments + Cash) | * | * | * | $XXX | A | $YYY | * | * | * | n | $XXX | $XXX |
| Offline/Interlink Mix | | | | | | | | | | | | |
| % Volume Mix | * | * | * | xx.x% | A | yy.y% | * | * | * | n | xx.x% | xx.x% |
| % Transaction Mix | * | * | * | xx.x% | A | yy.y% | * | * | * | n | xx.x% | xx.x% |
| PV/Cash Mix | | | | | | | | | | | | |
| % Volume Mix | * | * | * | xx.x% | A | yy.y% | * | * | * | n | xx.x% | xx.x% |
| % Transaction Mix | * | * | * | xx.x% | A | yy.y% | * | * | * | n | xx.x% | xx.x% |
| Interchange | | | | | | | | | | | | |
| Offline | * | * | * | xx.x% | A | yy.y% | * | * | * | n | xx.x% | xx.x% |
| Interlink | * | * | * | xx.x% | A | yy.y% | * | * | * | n | xx.x% | xx.x% |
| Payments | * | * | * | xx.x% | A | yy.y% | * | * | * | n | xx.x% | xx.x% |
| ATM Cash | * | * | * | xx.x% | A | yy.y% | * | * | * | n | xx.x% | xx.x% |
| Manual Cash | * | * | * | xx.x% | A | yy.y% | * | * | * | n | xx.x% | xx.x% |
| Total Cash | * | * | * | xx.x% | A | yy.y% | * | * | * | n | xx.x% | xx.x% |
| Total (Payments + Cash) | * | * | * | xx.x% | A | yy.y% | * | * | * | n | xx.x% | xx.x% |

700

| Account & Card Metrics | Issuer Name | Peer Rank | +/(-) Same Qtr. of Prior Year | * | * | * | # of Issuers in Peer Group | Peer Group Average* | Peer Group Best In Class |
|---|---|---|---|---|---|---|---|---|---|
| Account | | | | | | | | | |
| New Accounts ('000) | xxx | A | YYY | * | * | * | n | xxx | xxx |
| Total Accounts ('000) (end of quarter) | xxx | A | YYY | * | * | * | n | xxx | xxx |
| Active Accounts as % of Total Accounts | xx.x% | A | yy.y% | * | * | * | n | xx.x% | xx.x% |
| Average Outstanding Balance per Total Accounts (end of quarter) | $xxx | A | $YYY | * | * | * | n | $xxx | $xxx |
| Average Outstanding Balance per Active Accounts (end of quarter) | $xxx | A | $YYY | * | * | * | n | $xxx | $xxx |
| Card | | | | | | | | | |
| New Cards ('000) | xxx | A | YYY | * | * | * | n | xxx | xxx |
| New Cards as % of New Accounts | xx.x% | A | yy.y% | * | * | * | n | xx.x% | xx.x% |
| Total Cards as % of Total Accounts | xx.x% | A | yy.y% | * | * | * | n | xx.x% | xx.x% |

Fig. 8

| Usage Measurements | | | Issuer Name | Peer Rank | +/(-) Same Qtr. of Prior Year | | | | # of Issuers in Peer Group | Peer Group Average * | Peer Group Best in Class |
|---|---|---|---|---|---|---|---|---|---|---|---|
| Load (Initial Load and Reloads, net of Reversals) | | | | | | | | | | | |
| Average Monthly Load Amount per Active Accounts | * | * | $XXX | A | $YYY | * | * | * | n | $XXX | $XXX |
| Average Monthly Load Count per Active Accounts | * | * | XXX | A | YYY | * | * | * | n | XXX | XXX |
| Average Load Amount per Load Count | * | * | $XXX | A | $YYY | * | * | * | n | $XXX | $XXX |
| Spend $ | | | | | | | | | | | |
| Average Monthly Offline Volume per Active Accounts | * | * | $XXX | A | $YYY | * | * | * | n | $XXX | $XXX |
| Average Monthly Interlink Volume per Active Accounts | * | * | $XXX | A | $YYY | * | * | * | n | $XXX | $XXX |
| Average Monthly Payments Volume per Active Accounts | * | * | $XXX | A | $YYY | * | * | * | n | $XXX | $XXX |
| Average Monthly Cash Volume per Active Accounts | * | * | $XXX | A | $YYY | * | * | * | n | $XXX | $XXX |
| Average Monthly Total Sales Volume per Active Accounts | * | * | $XXX | A | $YYY | * | * | * | n | $XXX | $XXX |
| Spend Transactions | | | | | | | | | | | |
| Average Monthly Offline Transactions per Active Accounts | * | * | XXX | A | YYY | * | * | * | n | XXX | XXX |
| Average Monthly Interlink Transactions per Active Accounts | * | * | XXX | A | YYY | * | * | * | n | XXX | XXX |
| Average Monthly Payments Transactions per Active Accounts | * | * | XXX | A | YYY | * | * | * | n | XXX | XXX |
| Average Monthly Cash Transactions per Active Accounts | * | * | XXX | A | YYY | * | * | * | n | XXX | XXX |
| Average Monthly Total Transactions per Active Accounts | * | * | XXX | A | YYY | * | * | * | n | XXX | XXX |

*Fig. 9*

| Merchant Group Metrics (Payments Volume) | | | Issuer Name | Peer Rank | +/(-) Same Qtr. of Prior Year | | | # of Issuers in Peer Group | Peer Group Average* | Peer Group Best in Class |
|---|---|---|---|---|---|---|---|---|---|---|
| Bill Payment | | | | | | | | | | |
| % of Total Payments Volume | * | * | xx.x% | A | yy.y% | * | * | n | xx.x% | xx.x% |
| % of Total Payments Transactions | * | * | xx.x% | A | yy.y% | * | * | n | xx.x% | xx.x% |
| Average Ticket | * | * | $XXX | A | $YYY | * | * | n | $XXX | $XXX |
| Blended Interchange Rate | * | * | xx.x% | A | yy.y% | * | * | n | xx.x% | xx.x% |
| Other Retail | | | | | | | | | | |
| % of Total Payments Volume | * | * | xx.x% | A | yy.y% | * | * | n | xx.x% | xx.x% |
| % of Total Payments Transactions | * | * | xx.x% | A | yy.y% | * | * | n | xx.x% | xx.x% |
| Average Ticket | * | * | $XXX | A | $YYY | * | * | n | $XXX | $XXX |
| Blended Interchange Rate | * | * | xx.x% | A | yy.y% | * | * | n | xx.x% | xx.x% |
| Supermarkets | | | | | | | | | | |
| % of Total Payments Volume | * | * | xx.x% | A | yy.y% | * | * | n | xx.x% | xx.x% |
| % of Total Payments Transactions | * | * | xx.x% | A | yy.y% | * | * | n | xx.x% | xx.x% |
| Average Ticket | * | * | $XXX | A | $YYY | * | * | n | $XXX | $XXX |
| Blended Interchange Rate | * | * | xx.x% | A | yy.y% | * | * | n | xx.x% | xx.x% |
| Oil | | | | | | | | | | |
| % of Total Payments Volume | * | * | xx.x% | A | yy.y% | * | * | n | xx.x% | xx.x% |
| % of Total Payments Transactions | * | * | xx.x% | A | yy.y% | * | * | n | xx.x% | xx.x% |
| Average Ticket | * | * | $XXX | A | $YYY | * | * | n | $XXX | $XXX |
| Blended Interchange Rate | * | * | xx.x% | A | yy.y% | * | * | n | xx.x% | xx.x% |
| Remaining Merchants | | | | | | | | | | |
| % of Total Payments Volume | * | * | xx.x% | A | yy.y% | * | * | n | xx.x% | xx.x% |
| % of Total Payments Transactions | * | * | xx.x% | A | yy.y% | * | * | n | xx.x% | xx.x% |
| Average Ticket | * | * | $XXX | A | $YYY | * | * | n | $XXX | $XXX |
| Blended Interchange Rate | * | * | xx.x% | A | yy.y% | * | * | n | xx.x% | xx.x% |

| Merchant Group Metrics (Payments Volume) ...Continued | | | | Issuer Name | Peer Rank | +/(-) Same Qtr. of Prior Year | | | | # of Issuers in Peer Group | Peer Group Average * | Peer Group Best in Class |
|---|---|---|---|---|---|---|---|---|---|---|---|---|
| QSRs | | | | | | | | | | | | |
| % of Total Payments Volume | * | * | * | xx.x% | A | yy.y% | * | * | * | n | xx.x% | xx.x% |
| % of Total Payments Transactions | * | * | * | xx.x% | A | yy.y% | * | * | * | n | xx.x% | xx.x% |
| Average Ticket | * | * | * | $XXX | A | $YYY | * | * | * | n | $XXX | $XXX |
| Blended Interchange Rate | * | * | * | xx.x% | A | yy.y% | * | * | * | n | xx.x% | xx.x% |
| Restaurants | | | | | | | | | | | | |
| % of Total Payments Volume | * | * | * | xx.x% | A | yy.y% | * | * | * | n | xx.x% | xx.x% |
| % of Total Payments Transactions | * | * | * | xx.x% | A | yy.y% | * | * | * | n | xx.x% | xx.x% |
| Average Ticket | * | * | * | $XXX | A | $YYY | * | * | * | n | $XXX | $XXX |
| Blended Interchange Rate | * | * | * | xx.x% | A | yy.y% | * | * | * | n | xx.x% | xx.x% |
| Direct Marketing | | | | | | | | | | | | |
| % of Total Payments Volume | * | * | * | xx.x% | A | yy.y% | * | * | * | n | xx.x% | xx.x% |
| % of Total Payments Transactions | * | * | * | xx.x% | A | yy.y% | * | * | * | n | xx.x% | xx.x% |
| Average Ticket | * | * | * | $XXX | A | $YYY | * | * | * | n | $XXX | $XXX |
| Blended Interchange Rate | * | * | * | xx.x% | A | yy.y% | * | * | * | n | xx.x% | xx.x% |
| Other Travel & Entertainment | | | | | | | | | | | | |
| % of Total Payments Volume | * | * | * | xx.x% | A | yy.y% | * | * | * | n | xx.x% | xx.x% |
| % of Total Payments Transactions | * | * | * | xx.x% | A | yy.y% | * | * | * | n | xx.x% | xx.x% |
| Average Ticket | * | * | * | $XXX | A | $YYY | * | * | * | n | $XXX | $XXX |
| Blended Interchange Rate | * | * | * | xx.x% | A | yy.y% | * | * | * | n | xx.x% | xx.x% |
| All Others | | | | | | | | | | | | |
| % of Total Payments Volume | * | * | * | xx.x% | A | yy.y% | * | * | * | n | xx.x% | xx.x% |
| % of Total Payments Transactions | * | * | * | xx.x% | A | yy.y% | * | * | * | n | xx.x% | xx.x% |
| Average Ticket | * | * | * | $XXX | A | $YYY | * | * | * | n | $XXX | $XXX |
| Blended Interchange Rate | * | * | * | xx.x% | A | yy.y% | * | * | * | n | xx.x% | xx.x% |

*Fig. 11*

| Acceptance Channel Measurements (Payments Volume) | * | * | * | Issuer Name | Peer Rank | +/(-) Same Qtr. of Prior Year | * | * | * | # of Issuers in Peer Group | Peer Group Average * | Peer Group Best in Class |
|---|---|---|---|---|---|---|---|---|---|---|---|---|
| Face-to-Face | | | | | | | | | | | | |
| Payments Volume as a % of Total Payments Volume | * | * | * | xx.x% | A | yy.y% | * | * | * | n | xx.x% | xx.x% |
| Payments Transactions as a % of Total Payments Transactions | * | * | * | xx.x% | A | yy.y% | * | * | * | n | xx.x% | xx.x% |
| Average Ticket | * | * | * | $XXX | A | $YYY | * | * | * | n | $XXX | $XXX |
| MOTO | | | | | | | | | | | | |
| Payments Volume as a % of Total Payments Volume | * | * | * | xx.x% | A | yy.y% | * | * | * | n | xx.x% | xx.x% |
| Payments Transactions as a % of Total Payments Transactions | * | * | * | xx.x% | A | yy.y% | * | * | * | n | xx.x% | xx.x% |
| Average Ticket | * | * | * | $XXX | A | $YYY | * | * | * | n | $XXX | $XXX |
| Internet | | | | | | | | | | | | |
| Payments Volume as a % of Total Payments Volume | * | * | * | xx.x% | A | yy.y% | * | * | * | n | xx.x% | xx.x% |
| Transactions as a % of Total Payments Transactions | * | * | * | xx.x% | A | yy.y% | * | * | * | n | xx.x% | xx.x% |
| Average Ticket | * | * | * | $XXX | A | $YYY | * | * | * | n | $XXX | $XXX |
| Recurring | | | | | | | | | | | | |
| Payments Volume as a % of Total Payments Volume | * | * | * | xx.x% | A | yy.y% | * | * | * | n | xx.x% | xx.x% |
| Payments Transactions as a % of Total Payments Transactions | * | * | * | xx.x% | A | yy.y% | * | * | * | n | xx.x% | xx.x% |
| Average Ticket | * | * | * | $XXX | A | $YYY | * | * | * | n | $XXX | $XXX |

| Authorization Measurements (Payments Volume) | | | | Issuer Name | Peer Rank | +/(-) Same Qtr. of Prior Year | | | | # of Issuers in Peer Group | Peer Group Average * | Peer Group Best in Class |
|---|---|---|---|---|---|---|---|---|---|---|---|---|
| Authorization % - By Channel (based on Payments Transactions) | | | | | | | | | | | | |
| All Channels | | | | | | | | | | | | |
| Approval | * | * | * | xx.x% | A | yy.y% | * | * | * | n | xx.x% | xx.x% |
| Partial Approval | * | * | * | xx.x% | A | yy.y% | * | * | * | n | xx.x% | xx.x% |
| Insufficient Funds | * | * | * | xx.x% | A | yy.y% | * | * | * | n | xx.x% | xx.x% |
| Do Not Honor | * | * | * | xx.x% | A | yy.y% | * | * | * | n | xx.x% | xx.x% |
| All Other | * | * | * | xx.x% | A | yy.y% | * | * | * | n | xx.x% | xx.x% |
| Face-to-Face | | | | | | | | | | | | |
| Approval | * | * | * | xx.x% | A | yy.y% | * | * | * | n | xx.x% | xx.x% |
| Partial Approval | * | * | * | xx.x% | A | yy.y% | * | * | * | n | xx.x% | xx.x% |
| Insufficient Funds | * | * | * | xx.x% | A | yy.y% | * | * | * | n | xx.x% | xx.x% |
| Do Not Honor | * | * | * | xx.x% | A | yy.y% | * | * | * | n | xx.x% | xx.x% |
| All Other | * | * | * | xx.x% | A | yy.y% | * | * | * | n | xx.x% | xx.x% |
| MOTO | | | | | | | | | | | | |
| Approval | * | * | * | xx.x% | A | yy.y% | * | * | * | n | xx.x% | xx.x% |
| Partial Approval | * | * | * | xx.x% | A | yy.y% | * | * | * | n | xx.x% | xx.x% |
| Insufficient Funds | * | * | * | xx.x% | A | yy.y% | * | * | * | n | xx.x% | xx.x% |
| Do Not Honor | * | * | * | xx.x% | A | yy.y% | * | * | * | n | xx.x% | xx.x% |
| All Other | * | * | * | xx.x% | A | yy.y% | * | * | * | n | xx.x% | xx.x% |
| Internet | | | | | | | | | | | | |
| Approval | * | * | * | xx.x% | A | yy.y% | * | * | * | n | xx.x% | xx.x% |
| Partial Approval | * | * | * | xx.x% | A | yy.y% | * | * | * | n | xx.x% | xx.x% |
| Insufficient Funds | * | * | * | xx.x% | A | yy.y% | * | * | * | n | xx.x% | xx.x% |
| Do Not Honor | * | * | * | xx.x% | A | yy.y% | * | * | * | n | xx.x% | xx.x% |
| All Other | * | * | * | xx.x% | A | yy.y% | * | * | * | n | xx.x% | xx.x% |
| Recurring | | | | | | | | | | | | |
| Approval | * | * | * | xx.x% | A | yy.y% | * | * | * | n | xx.x% | xx.x% |
| Partial Approval | * | * | * | xx.x% | A | yy.y% | * | * | * | n | xx.x% | xx.x% |
| Insufficient Funds | * | * | * | xx.x% | A | yy.y% | * | * | * | n | xx.x% | xx.x% |
| Do Not Honor | * | * | * | xx.x% | A | yy.y% | * | * | * | n | xx.x% | xx.x% |
| All Other | * | * | * | xx.x% | A | yy.y% | * | * | * | n | xx.x% | xx.x% |
| Average Authorization Ticket (excludes AFD transactions) | | | | | | | | | | | | |
| Approval | * | * | * | xx.x% | A | yy.y% | * | * | * | n | xx.x% | xx.x% |
| Partial Approval | * | * | * | xx.x% | A | yy.y% | * | * | * | n | xx.x% | xx.x% |
| Insufficient Funds | * | * | * | xx.x% | A | yy.y% | * | * | * | n | xx.x% | xx.x% |
| Do Not Honor | * | * | * | xx.x% | A | yy.y% | * | * | * | n | xx.x% | xx.x% |
| All Other | * | * | * | xx.x% | A | yy.y% | * | * | * | n | xx.x% | xx.x% |

1300

| Net Charge-Off Metrics | | | Issuer Name | Peer Rank | +/(-) Same Qtr. of Prior Year | | | | # of Issuers in Peer Group | Peer Group Average * | Peer Group Best in Class |
|---|---|---|---|---|---|---|---|---|---|---|---|
| Net Charge-Off Amount per Active Account | | | | | | | | | | | |
| Load Losses | * | * | $XXX | A | $YYY | * | * | * | n | $XXX | $XXX |
| Fraud Charge-Offs | * | * | $XXX | A | $YYY | * | * | * | n | $XXX | $XXX |
| Other Unrecoverable Losses & Negative Balances | * | * | $XXX | A | $YYY | * | * | * | n | $XXX | $XXX |
| Total Charge-Offs | * | * | $XXX | A | $YYY | * | * | * | n | $XXX | $XXX |
| Charge-Off Count per Active Account | | | | | | | | | | | |
| Load Losses | * | * | XXX | A | YYY | * | * | * | n | XXX | XXX |
| Fraud Charge-Offs | * | * | XXX | A | YYY | * | * | * | n | XXX | XXX |
| Other Unrecoverable Losses & Negative Balances | * | * | XXX | A | YYY | * | * | * | n | XXX | XXX |
| Total Charge-Offs | * | * | XXX | A | YYY | * | * | * | n | XXX | XXX |

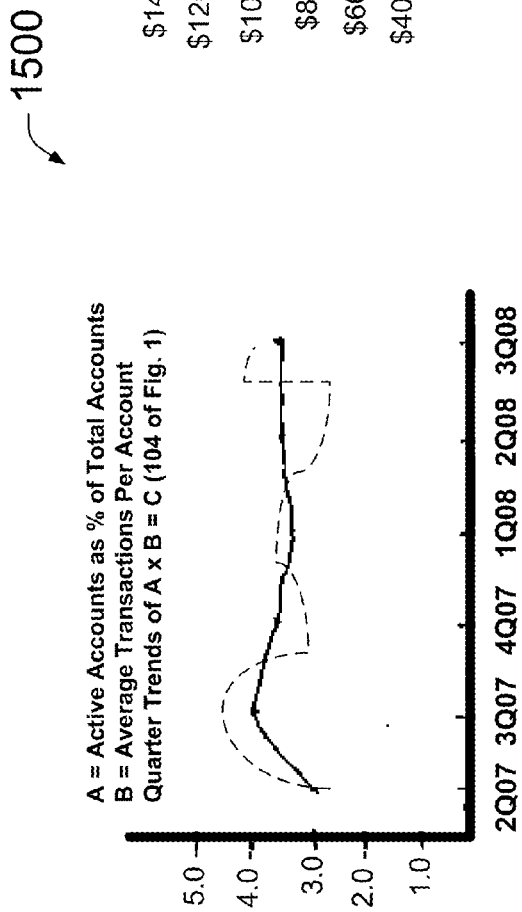
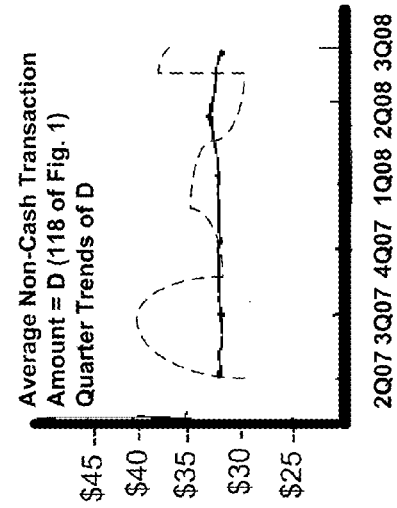
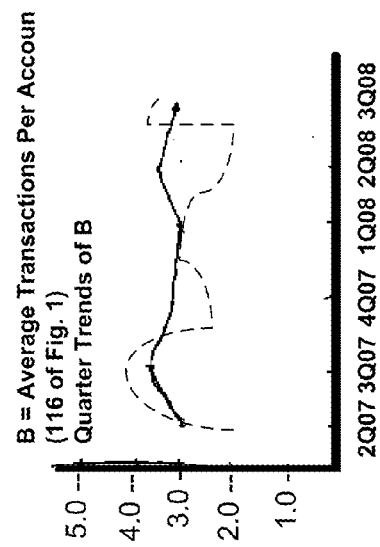
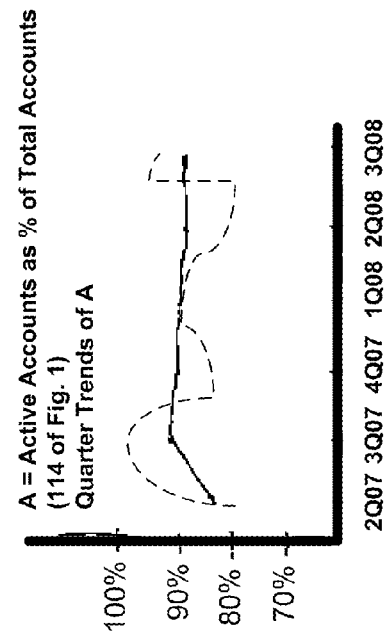
Fig. 15a, Fig. 15b, Fig. 15c, Fig. 15d, Fig. 15e

| | B6 | $f_x$ =VLOOKUP($C6,RawO |
|---|---|---|
| | A | B |
| 1 | Notes (section) | Output Metric |
| 2 | Volume Metrics | 10.10.10 Offline |
| 3 | Amount ($MM) | 10.10.20 Interlink ** |
| 4 | | 10.10.30 Payments Volume |
| 5 | | 10.10.40 ATM Cash |
| 6 | | 10.10.50 Manual Cash |
| 7 | | 10.10.60 Cashback |
| 8 | | 10.10.70 Total Cash Volume |
| 9 | | 10.10.80 Total Volume (Payments + Cash) |
| 10 | % YoY Quarterly Volume Growth | 10.20.10 Offline |
| 11 | | 10.20.20 Interlink ** |
| 12 | | 10.20.30 Payments Volume |
| 13 | | 10.20.40 ATM Cash |
| 14 | | 10.20.50 Manual Cash |
| 15 | | 10.20.60 Cashback |
| 16 | | 10.20.70 Total Cash Volume |
| 17 | | 10.20.80 Total Volume (Payments + Cash) |
| 18 | | 10.30.10 Offline |
| 19 | | 10.30.20 Interlink ** |
| 20 | | 10.30.30 Payments Volume |
| 21 | | 10.30.40 ATM Cash |
| 22 | | 10.30.50 Manual Cash |
| 23 | | 10.30.60 Cashback |
| 24 | | 10.30.70 Total Cash Volume |
| 25 | | 10.30.30 Payments Volume |

← 1600a

→ 16b

*Fig. 16a* vOutputMetrics!$A:$D,2,FALSE)

| | C | D | E | F |
|---|---|---|---|---|
| | Metric ID | Month1 | Month2 | Month3 |
| | 200 | 25.2 | 28 | 30.8 |
| | 201 | 16.2 | 18 | 19.8 |
| | 202 | 41.4 | 46 | 50.6 |
| | 203 | 2.7 | 3 | 3.3 |
| | 204 | 7 | 8 | 9 |
| | 205 | 5 | 6 | 7 |
| | 206 | 15 | 17 | 19 |
| | 207 | 57 | 63 | 69 |
| | 208 | | | 150.00% |
| | 209 | | | |
| | 210 | | | |
| | 211 | | | |
| | 212 | | | |
| | 213 | | | |
| | 214 | | | |
| | 215 | | | |
| | 216 | | | |
| | 217 | | | |
| | 218 | | | |
| | 219 | | | |
| | 220 | | | |
| | 221 | | | |
| | 222 | | | |
| | 223 | | | |

⟵ 1600b

→ 16c

PartData / RawVisaData /

*Fig. 16B*

" & VLOOKUP($C6,RawOutputMetrics!$A:$D,3,FALSE)

| H |
|---|
| Notes2: Formula for Quarterly Reporting |
| Total Offline $ Volume for the participant during current quarter / 1,000,000 |
| Total Interlink $ Volume for the participant during current quarter / 1,000,000 |
| Sum of Offline $ Volume and Interlink $ Volume for the participant during current quarter / 1,000,000 |
| ATM Cash $ Volume for the current quarter / 1,000,000 |
| Manual Cash $ Volume for the current quarter / 1,000,000 |
| Cashback $ Volume for the current quarter / 1,000,000 |
| Sum of ATM Cash $, Manual Cash $ and Cashback $ for the current quarter / 1,000,000 |
| Sum of Total Payments Volume (Row 7) and Total Cash Volume (Row 11) / 1,000,000 |
| |
| (Total Offline $ Volume for participant during current quarter) / |

1600c

*Fig. 16C* artData / RawOutputMetrics

1700a

E8    fx  =VLOOKUP($A8,RawVisaData!$A:$K,COL

| | A | B | C |
|---|---|---|---|
| 1 | | | P |
| 2 | Metric I | Name | Month 1 |
| 3 | 125 | Total Offline $ Volume | 8,400,000 |
| 4 | 115 | Total Interlink $ Volume | 5,400,000 |
| 5 | 100 | ATM Cash $ Volume | 900,000 |
| 6 | 105 | Manual Cash $ Volume | 2,400,000 |
| 7 | 103 | Cashback $ Volume | 1,800,000 |
| 8 | 126 | Total Offline $ Volume for the entire product | 8,700,000 |
| 9 | 116 | Total Interlink $ Volume for the entire product | 5,700,000 |
| 10 | 107 | Total ATM Cash $ Volume for entire product | 3,000,000 |
| 11 | 121 | Total Manual Cash $ Volume for entire product | 7,200,000 |
| 12 | 111 | Total Cashback $ Volume for entire product | 4,200,000 |
| 13 | 128 | Total Offline Transactions | 9,300,000 |
| 14 | 118 | Total Interlink Transactions | 6,300,000 |
| 15 | 101 | ATM Cash Transactions for the current quarter | 1,200,000 |
| 16 | 103 | Cashback $ Volume | 1,800,000 |
| 17 | 104 | Cashback Transactions for the current quarter | 2,100,000 |
| 18 | 129 | Total Offline Transactions for the entire product | 9,600,000 |
| 19 | 119 | Total Interlink Transactions for the entire product | 6,600,000 |
| 20 | 102 | Balance / Available Funds Inquiry Transaction count with Acquirer Mes | 1,500,000 |
| 21 | 108 | Total ATM Cash $ Volume from U.S.A. | 3,300,000 |
| 22 | 109 | Total ATM Cash Transactions for entire product | 3,600,000 |
| 23 | 110 | Total ATM Cash Transactions from U.S.A. | 3,900,000 |
| 24 | 112 | Total Cashback $ Volume from U.S.A. | 4,500,000 |
| 25 | 113 | Total Cashback Transactions for entire product | 4,800,000 |
| 26 | 114 | Total Cashback Transactions from U.S.A. | 5,100,000 |
| 27 | 117 | Total Interlink $ Volume from U.S.A. | 6,000,000 |
| 28 | 120 | Total Interlink Transactions from U.S.A. | 6,900,000 |
| 29 | 122 | Total Manual Cash $ Volume from U.S.A. | 7,500,000 |
| 30 | 123 | Total Manual Cash Transactions for entire product | 7,800,000 |
| 31 | 124 | Total Manual Cash Transactions from U.S.A. | 8,100,000 |
| 32 | 127 | Total Offline $ Volume from U.S.A. | 9,000,000 |
| 33 | 130 | Total Offline Transactions from U.S.A. | 9,900,000 |
| 34 | 131 | Total Source Fee Amount for Interlink Transactions | 10,200,000 |
| 35 | 132 | Total Source Fee Amount for NonUS Merchant | 10,500,000 |
| 36 | 133 | Total Source Fee Amount for Offline Transactions | 10,800,000 |
| 37 | 134 | Total Source Fee Amount for US Merchant | 11,100,000 |
| 38 | 106 | Manual Cash Transactions for the current quarter | 2700000 |
| 39 | 135 | Total Tran Amount for NonUS Merchants | 11400000 |
| 40 | 136 | Total Tran Amount for US Merchants | 11700000 |
| 41 | 137 | Total Transaction count for MCC 6011 for Merchant Region U.S.A. for ' | 12000000 |
| 42 | 138 | Total Transaction count for MCC 6011 for Merchant Region U.S.A. for ' | 12300000 |

Instructions / Calculations \ VisaData / PartData / RawVis

Ready

*Fig. 17a*

A:$K,COLUMN(E8),FALSE)

1700b

| C | D | E | F | G |
|---|---|---|---|---|
| Prior Year | | | Prior Quarter | |
| Month 1 | Month 2 | Month 3 | Month 1 | Month 2 |
| 8,400,000 | 11,200,000 | 14,000,000 | 16,800,000 | 19,600,000 |
| 5,400,000 | 7,200,000 | 9,000,000 | 10,800,000 | 12,600,000 |
| 900,000 | 1,200,000 | 1,500,000 | 1,800,000 | 2,100,000 |
| 2,400,000 | 3,200,000 | 4,000,000 | 4,800,000 | 5,600,000 |
| 1,800,000 | 2,400,000 | 3,000,000 | 3,600,000 | 4,200,000 |
| 8,700,000 | 11,600,000 | 14,500,000 | 17,400,000 | 20,300,000 |
| 5,700,000 | 7,600,000 | 9,500,000 | 11,400,000 | 13,300,000 |
| 3,000,000 | 4,000,000 | 5,000,000 | 6,000,000 | 7,000,000 |
| 7,200,000 | 9,600,000 | 12,000,000 | 14,400,000 | 16,800,000 |
| 4,200,000 | 5,600,000 | 7,000,000 | 8,400,000 | 9,800,000 |
| 9,300,000 | 12,400,000 | 15,500,000 | 18,600,000 | 21,700,000 |
| 6,300,000 | 8,400,000 | 10,500,000 | 12,600,000 | 14,700,000 |
| 1,200,000 | 1,600,000 | 2,000,000 | 2,400,000 | 2,800,000 |
| 1,800,000 | 2,400,000 | 3,000,000 | 3,600,000 | 4,200,000 |
| 2,100,000 | 2,800,000 | 3,500,000 | 4,200,000 | 4,900,000 |
| 9,600,000 | 12,800,000 | 16,000,000 | 19,200,000 | 22,400,000 |
| 6,600,000 | 8,800,000 | 11,000,000 | 13,200,000 | 15,400,000 |
| 1,500,000 | 2,000,000 | 2,500,000 | 3,000,000 | 3,500,000 |
| 3,300,000 | 4,400,000 | 5,500,000 | 6,600,000 | 7,700,000 |
| 3,600,000 | 4,800,000 | 6,000,000 | 7,200,000 | 8,400,000 |
| 3,900,000 | 5,200,000 | 6,500,000 | 7,800,000 | 9,100,000 |
| 4,500,000 | 6,000,000 | 7,500,000 | 9,000,000 | 10,500,000 |
| 4,800,000 | 6,400,000 | 8,000,000 | 9,600,000 | 11,200,000 |
| 5,100,000 | 6,800,000 | 8,500,000 | 10,200,000 | 11,900,000 |
| 6,000,000 | 8,000,000 | 10,000,000 | 12,000,000 | 14,000,000 |
| 6,900,000 | 9,200,000 | 11,500,000 | 13,800,000 | 16,100,000 |
| 7,500,000 | 10,000,000 | 12,500,000 | 15,000,000 | 17,500,000 |
| 7,800,000 | 10,400,000 | 13,000,000 | 15,600,000 | 18,200,000 |
| 8,100,000 | 10,800,000 | 13,500,000 | 16,200,000 | 18,900,000 |
| 9,000,000 | 12,000,000 | 15,000,000 | 18,000,000 | 21,000,000 |
| 9,900,000 | 13,200,000 | 16,500,000 | 19,800,000 | 23,100,000 |
| 10,200,000 | 13,600,000 | 17,000,000 | 20,400,000 | 23,800,000 |
| 10,500,000 | 14,000,000 | 17,500,000 | 21,000,000 | 24,500,000 |
| 10,800,000 | 14,400,000 | 18,000,000 | 21,600,000 | 25,200,000 |
| 11,100,000 | 14,800,000 | 18,500,000 | 22,200,000 | 25,900,000 |
| 2700000 | 3600000 | 4500000 | 5400000 | 6300000 |
| 11400000 | 15200000 | 19000000 | 22800000 | 26600000 |
| 11700000 | 15600000 | 19500000 | 23400000 | 27300000 |
| 12000000 | 16000000 | 20000000 | 24000000 | 28000000 |
| 12300000 | 16400000 | 20500000 | 24600000 | 28700000 |

→ 17c

/ RawVisaData / RawPartData / RawOutput

| H | I | J | K | L | M |
|---|---|---|---|---|---|
| | | Current Quarter | | Notes | |
| Month 3 | Month 1 | Month 2 | Month 3 | | |
| 22,400,000 | 25,200,000 | 28,000,000 | 30,800,000 | | |
| 14,400,000 | 16,200,000 | 18,000,000 | 19,800,000 | | |
| 2,400,000 | 2,700,000 | 3,000,000 | 3,300,000 | | |
| 6,400,000 | 7,200,000 | 8,000,000 | 8,800,000 | | |
| 4,800,000 | 5,400,000 | 6,000,000 | 6,600,000 | | |
| 23,200,000 | 26,100,000 | 29,000,000 | 31,900,000 | | |
| 15,200,000 | 17,100,000 | 19,000,000 | 20,900,000 | | |
| 8,000,000 | 9,000,000 | 10,000,000 | 11,000,000 | | |
| 19,200,000 | 21,600,000 | 24,000,000 | 26,400,000 | | |
| 11,200,000 | 12,600,000 | 14,000,000 | 15,400,000 | | |
| 24,800,000 | 27,900,000 | 31,000,000 | 34,100,000 | | |
| 16,800,000 | 18,900,000 | 21,000,000 | 23,100,000 | | |
| 3,200,000 | 3,600,000 | 4,000,000 | 4,400,000 | | |
| 4,800,000 | 5,400,000 | 6,000,000 | 6,600,000 | | |
| 5,600,000 | 6,300,000 | 7,000,000 | 7,700,000 | | |
| 25,600,000 | 28,800,000 | 32,000,000 | 35,200,000 | | |
| 17,600,000 | 19,800,000 | 22,000,000 | 24,200,000 | | |
| 4,000,000 | 4,500,000 | 5,000,000 | 5,500,000 | | |
| 8,800,000 | 9,900,000 | 11,000,000 | 12,100,000 | | |
| 9,600,000 | 10,800,000 | 12,000,000 | 13,200,000 | | |
| 10,400,000 | 11,700,000 | 13,000,000 | 14,300,000 | | |
| 12,000,000 | 13,500,000 | 15,000,000 | 16,500,000 | | |
| 12,800,000 | 14,400,000 | 16,000,000 | 17,600,000 | | |
| 13,600,000 | 15,300,000 | 17,000,000 | 18,700,000 | | |
| 16,000,000 | 18,000,000 | 20,000,000 | 22,000,000 | | |
| 18,400,000 | 20,700,000 | 23,000,000 | 25,300,000 | | |
| 20,000,000 | 22,500,000 | 25,000,000 | 27,500,000 | | |
| 20,800,000 | 23,400,000 | 26,000,000 | 28,600,000 | | |
| 21,600,000 | 24,300,000 | 27,000,000 | 29,700,000 | | |
| 24,000,000 | 27,000,000 | 30,000,000 | 33,000,000 | | |
| 26,400,000 | 29,700,000 | 33,000,000 | 36,300,000 | | |
| 27,200,000 | 30,600,000 | 34,000,000 | 37,400,000 | | |
| 28,000,000 | 31,500,000 | 35,000,000 | 38,500,000 | | |
| 28,800,000 | 32,400,000 | 36,000,000 | 39,600,000 | | |
| 29,600,000 | 33,300,000 | 37,000,000 | 40,700,000 | | |
| 7200000 | 8100000 | 9000000 | 9900000 | | |
| 30400000 | 34200000 | 38000000 | 41800000 | | |
| 31200000 | 35100000 | 39000000 | 42900000 | | |
| 32000000 | 36000000 | 40000000 | 44000000 | | |
| 32800000 | 36900000 | 41000000 | 45100000 | | |

*Fig. 17c*

Metrics
NUM

1800a

`B33    fx =VLOOKUP($A33,RawPartData!$A:$L,COLUN`

| | A | B | C |
|---|---|---|---|
| 1 | | | |
| 2 | Metric ID | Location | Name |
| 3 | 1 | 10.10 | New Card Accounts |
| 4 | 2 | 10.20 | Total Card Accounts |
| 5 | 3 | 10.30 | Active Card Accounts |
| 6 | 4 | 10.40 | Card Accounts with Purchase Transaction |
| 7 | 5 | 10.50 | Card Accounts with Purchase or Cash Transaction |
| 8 | 6 | 10.60 | Card Accounts with Initial Load Transaction |
| 9 | 7 | 10.70 | Card Accounts with Reload Transaction |
| 10 | 8 | 10.80 | Card Accounts with Reload Transaction using Direct Deposit |
| 11 | 9 | 10.90 | Total Cards Associated with Total Card Accounts |
| 12 | 10 | 20.10 | Initial Load Amount |
| 13 | 11 | 20.15 | Initial Load Amount using Direct Deposit |
| 14 | 12 | 20.20 | Initial Load Amount using Cash |
| 15 | 13 | 20.30 | Reload Amount |
| 16 | 14 | 20.35 | Reload Amount using Direct Deposit |
| 17 | 15 | 20.40 | Reload Amount using Cash |
| 18 | 16 | 20.50 | Initial Load Counts |
| 19 | 17 | 20.55 | Initial Load Counts using Direct Deposit |
| 20 | 18 | 20.60 | Initial Load Counts using Cash |
| 21 | 19 | 20.70 | Reload Counts |
| 22 | 20 | 20.75 | Reload Counts using Direct Deposit |
| 23 | 21 | 20.80 | Reload Counts using Cash |
| 24 | 22 | 30.10 | Load Losses ($) |
| 25 | 23 | 30.20 | Fraud Charge-offs ($) |
| 26 | 24 | 30.30 | Other Charge-offs ($) |
| 27 | 25 | 30.40 | Load Losses (#) |
| 28 | 26 | 30.50 | Fraud Charge-offs (#) |
| 29 | 27 | 30.60 | Other Charge-offs (#) |
| 30 | 28 | 40.10 | Bill Payment Volume, Non-Visa |
| 31 | 29 | 40.20 | Bill Payment Volume, PIN-Less |
| 32 | 30 | 40.30 | Bill Payment Transaction Counts, Non-Visa |
| 33 | 31 | 40.40 | Bill Payment Transaction Counts, PIN-Less |

→ 18b

Calculations / VisaData \ PartData / RawVisaData / RawPartD

Ready

*Fig. 18a*

/N(B33),FALSE)

| | D | E | F | G | H | |
|---|---|---|---|---|---|---|
| | \multicolumn{3}{c}{Prior Year} | | \multicolumn{2}{c}{Prior Quarter} | |
| | Month 1 | Month 2 | Month 3 | Month 1 | Month 2 | Mor |
| | 1,552,000 | 1,455,000 | 1,358,000 | 1,261,000 | 1,164,000 | 1,0€ |
| | 1,536,000 | 1,440,000 | 1,344,000 | 1,248,000 | 1,152,000 | 1,0! |
| | 1,520,000 | 1,425,000 | 1,330,000 | 1,235,000 | 1,140,000 | 1,0· |
| | ,504,000 | 1,410,000 | 1,316,000 | 1,222,000 | 1,128,000 | 1,0: |
| 1800b | ,488,000 | 1,395,000 | 1,302,000 | 1,209,000 | 1,116,000 | 1,0: |
| | ,472,000 | 1,380,000 | 1,288,000 | 1,196,000 | 1,104,000 | 1,01 |
| | ,456,000 | 1,365,000 | 1,274,000 | 1,183,000 | 1,092,000 | 1,0( |
| | 1,440,000 | 1,350,000 | 1,260,000 | 1,170,000 | 1,080,000 | 9! |
| | 1,424,000 | 1,335,000 | 1,246,000 | 1,157,000 | 1,068,000 | 9; |
| | 1,408,000 | 1,320,000 | 1,232,000 | 1,144,000 | 1,056,000 | 9€ |
| | 1,392,000 | 1,305,000 | 1,218,000 | 1,131,000 | 1,044,000 | 9! |
| | 1,376,000 | 1,290,000 | 1,204,000 | 1,118,000 | 1,032,000 | 9· |
| | 1,360,000 | 1,275,000 | 1,190,000 | 1,105,000 | 1,020,000 | 9: |
| | 1,344,000 | 1,260,000 | 1,176,000 | 1,092,000 | 1,008,000 | 9: |
| | 1,328,000 | 1,245,000 | 1,162,000 | 1,079,000 | 996,000 | 91 |
| | 1,312,000 | 1,230,000 | 1,148,000 | 1,066,000 | 984,000 | 9( |
| | 1,296,000 | 1,215,000 | 1,134,000 | 1,053,000 | 972,000 | 8! |
| | 1,280,000 | 1,200,000 | 1,120,000 | 1,040,000 | 960,000 | 8€ |
| | 1,264,000 | 1,185,000 | 1,106,000 | 1,027,000 | 948,000 | 8€ |
| | 1,248,000 | 1,170,000 | 1,092,000 | 1,014,000 | 936,000 | 8! |
| | 1,232,000 | 1,155,000 | 1,078,000 | 1,001,000 | 924,000 | 8· |
| | 1,216,000 | 1,140,000 | 1,064,000 | 988,000 | 912,000 | 8: |
| | 1,200,000 | 1,125,000 | 1,050,000 | 975,000 | 900,000 | 8: |
| | 1,184,000 | 1,110,000 | 1,036,000 | 962,000 | 888,000 | 81 |
| | 1,168,000 | 1,095,000 | 1,022,000 | 949,000 | 876,000 | 8( |
| | 1152000 | 1080000 | 1008000 | 936000 | 864000 | 7 |
| | 1136000 | 1065000 | 994000 | 923000 | 852000 | 7 |
| | 1120000 | 1050000 | 980000 | 910000 | 840000 | 7 |
| | 1104000 | 1035000 | 966000 | 897000 | 828000 | 7 |
| | 1088000 | 1020000 | 952000 | 884000 | 816000 | 7 |
| | 1072000 | 1005000 | 938000 | 871000 | 804000 | 7 |

)ata / RawOutputMetrics /

1800c

| I | J | K | L | |
|---|---|---|---|---|
| | | Current Quarter | | Notes |
| lonth 3 | Month 1 | Month 2 | Month 3 | |
| ,067,000 | 970,000 | 873,000 | 776,000 | |
| ,056,000 | 960,000 | 864,000 | 768,000 | |
| ,045,000 | 950,000 | 855,000 | 760,000 | |
| ,034,000 | 940,000 | 846,000 | 752,000 | |
| ,023,000 | 930,000 | 837,000 | 744,000 | |
| ,012,000 | 920,000 | 828,000 | 736,000 | |
| ,001,000 | 910,000 | 819,000 | 728,000 | |
| 990,000 | 900,000 | 810,000 | 720,000 | |
| 979,000 | 890,000 | 801,000 | 712,000 | |
| 968,000 | 880,000 | 792,000 | 704,000 | |
| 957,000 | 870,000 | 783,000 | 696,000 | |
| 946,000 | 860,000 | 774,000 | 688,000 | |
| 935,000 | 850,000 | 765,000 | 680,000 | |
| 924,000 | 840,000 | 756,000 | 672,000 | |
| 913,000 | 830,000 | 747,000 | 664,000 | |
| 902,000 | 820,000 | 738,000 | 656,000 | |
| 891,000 | 810,000 | 729,000 | 648,000 | |
| 880,000 | 800,000 | 720,000 | 640,000 | |
| 869,000 | 790,000 | 711,000 | 632,000 | |
| 858,000 | 780,000 | 702,000 | 624,000 | |
| 847,000 | 770,000 | 693,000 | 616,000 | |
| 836,000 | 760,000 | 684,000 | 608,000 | |
| 825,000 | 750,000 | 675,000 | 600,000 | |
| 814,000 | 740,000 | 666,000 | 592,000 | |
| 803,000 | 730,000 | 657,000 | 584,000 | |
| 792000 | 720000 | 648000 | 576000 | |
| 781000 | 710000 | 639000 | 568000 | |
| 770000 | 700000 | 630000 | 560000 | |
| 759000 | 690000 | 621000 | 552000 | |
| 748000 | 680000 | 612000 | 544000 | |
| 737000 | 670000 | 603000 | 536000 | |

NUM

*Fig. 18c*

|  | C | D | E | F |  |
|---|---|---|---|---|---|
|  | \multicolumn{4}{c}{Prior Year} | Pric |
|  | Month 1 | Month 2 | Month 3 | Month 1 | M |
|  | 900,000 | 1,200,000 | 1,500,000 | 1,800,000 |  |
|  | 1,200,000 | 1,600,000 | 2,000,000 | 2,400,000 |  |
|  | 1,500,000 | 2,000,000 | 2,500,000 | 3,000,000 |  |
|  | 1,800,000 | 2,400,000 | 3,000,000 | 3,600,000 |  |
|  | 2,100,000 | 2,800,000 | 3,500,000 | 4,200,000 |  |
|  | 2,400,000 | 3,200,000 | 4,000,000 | 4,800,000 |  |
|  | 2,700,000 | 3,600,000 | 4,500,000 | 5,400,000 |  |
|  | 3,000,000 | 4,000,000 | 5,000,000 | 6,000,000 |  |
|  | 3,300,000 | 4,400,000 | 5,500,000 | 6,600,000 |  |
|  | 3,600,000 | 4,800,000 | 6,000,000 | 7,200,000 |  |
|  | 3,900,000 | 5,200,000 | 6,500,000 | 7,800,000 |  |
|  | 4,200,000 | 5,600,000 | 7,000,000 | 8,400,000 |  |
|  | 4,500,000 | 6,000,000 | 7,500,000 | 9,000,000 | 1 |
|  | 4,800,000 | 6,400,000 | 8,000,000 | 9,600,000 |  |
|  | 5,100,000 | 6,800,000 | 8,500,000 | 10,200,000 |  |
|  | 5,400,000 | 7,200,000 | 9,000,000 | 10,800,000 | 1 |
|  | 5,700,000 | 7,600,000 | 9,500,000 | 11,400,000 | 1 |
|  | 6,000,000 | 8,000,000 | 10,000,000 | 12,000,000 |  |
|  | 6,300,000 | 8,400,000 | 10,500,000 | 12,600,000 | 1 |
|  | 6,600,000 | 8,800,000 | 11,000,000 | 13,200,000 | 1 |
|  | 6,900,000 | 9,200,000 | 11,500,000 | 13,800,000 |  |
|  | 7,200,000 | 9,600,000 | 12,000,000 | 14,400,000 | 1 |
|  | 7,500,000 | 10,000,000 | 12,500,000 | 15,000,000 | 1 |
|  | 7,800,000 | 10,400,000 | 13,000,000 | 15,600,000 | 1 |
|  | 8,100,000 | 10,800,000 | 13,500,000 | 16,200,000 | 1 |
|  | 8,400,000 | 11,200,000 | 14,000,000 | 16,800,000 | 1 |
|  | 8,700,000 | 11,600,000 | 14,500,000 | 17,400,000 | 2 |
|  | 9,000,000 | 12,000,000 | 15,000,000 | 18,000,000 | 2 |
|  | 9,300,000 | 12,400,000 | 15,500,000 | 18,600,000 | 2 |
|  | 9,600,000 | 12,800,000 | 16,000,000 | 19,200,000 | 2 |
|  | 9,900,000 | 13,200,000 | 16,500,000 | 19,800,000 | 2 |
|  | 10,200,000 | 13,600,000 | 17,000,000 | 20,400,000 | 2 |
|  | 10,500,000 | 14,000,000 | 17,500,000 | 21,000,000 | 2 |
|  | 10,800,000 | 14,400,000 | 18,000,000 | 21,600,000 | 2 |
|  | 11,100,000 | 14,800,000 | 18,500,000 | 22,200,000 | 2 |
|  | 11,400,000 | 15,200,000 | 19,000,000 | 22,800,000 | 2 |
|  | 11,700,000 | 15,600,000 | 19,500,000 | 23,400,000 | 2 |
|  | 12,000,000 | 16,000,000 | 20,000,000 | 24,000,000 | 2 |
|  | 12,300,000 | 16,400,000 | 20,500,000 | 24,600,000 | 2 |

1900b awPartData / RawOutputMetrics /

| ior Quarter | | Current Quarter | | |
|---|---|---|---|---|
| Month 2 | Month 3 | Month 1 | Month 2 | Month 3 |
| 2,100,000 | 2,400,000 | 2,700,000 | 3,000,000 | 3,300,000 |
| 2,800,000 | 3,200,000 | 3,600,000 | 4,000,000 | 4,400,000 |
| 3,500,000 | 4,000,000 | 4,500,000 | 5,000,000 | 5,500,000 |
| 4,200,000 | 4,800,000 | 5,400,000 | 6,000,000 | 6,600,000 |
| 4,900,000 | 5,600,000 | 6,300,000 | 7,000,000 | 7,700,000 |
| 5,600,000 | 6,400,000 | 7,200,000 | 8,000,000 | 8,800,000 |
| 6,300,000 | 7,200,000 | 8,100,000 | 9,000,000 | 9,900,000 |
| 7,000,000 | 8,000,000 | 9,000,000 | 10,000,000 | 11,000,000 |
| 7,700,000 | 8,800,000 | 9,900,000 | 11,000,000 | 12,100,000 |
| 8,400,000 | 9,600,000 | 10,800,000 | 12,000,000 | 13,200,000 |
| 9,100,000 | 10,400,000 | 11,700,000 | 13,000,000 | 14,300,000 |
| 9,800,000 | 11,200,000 | 12,600,000 | 14,000,000 | 15,400,000 |
| 10,500,000 | 12,000,000 | 13,500,000 | 15,000,000 | 16,500,000 |
| 11,200,000 | 12,800,000 | 14,400,000 | 16,000,000 | 17,600,000 |
| 11,900,000 | 13,600,000 | 15,300,000 | 17,000,000 | 18,700,000 |
| 12,600,000 | 14,400,000 | 16,200,000 | 18,000,000 | 19,800,000 |
| 13,300,000 | 15,200,000 | 17,100,000 | 19,000,000 | 20,900,000 |
| 14,000,000 | 16,000,000 | 18,000,000 | 20,000,000 | 22,000,000 |
| 14,700,000 | 16,800,000 | 18,900,000 | 21,000,000 | 23,100,000 |
| 15,400,000 | 17,600,000 | 19,800,000 | 22,000,000 | 24,200,000 |
| 16,100,000 | 18,400,000 | 20,700,000 | 23,000,000 | 25,300,000 |
| 16,800,000 | 19,200,000 | 21,600,000 | 24,000,000 | 26,400,000 |
| 17,500,000 | 20,000,000 | 22,500,000 | 25,000,000 | 27,500,000 |
| 18,200,000 | 20,800,000 | 23,400,000 | 26,000,000 | 28,600,000 |
| 18,900,000 | 21,600,000 | 24,300,000 | 27,000,000 | 29,700,000 |
| 19,600,000 | 22,400,000 | 25,200,000 | 28,000,000 | 30,800,000 |
| 20,300,000 | 23,200,000 | 26,100,000 | 29,000,000 | 31,900,000 |
| 21,000,000 | 24,000,000 | 27,000,000 | 30,000,000 | 33,000,000 |
| 21,700,000 | 24,800,000 | 27,900,000 | 31,000,000 | 34,100,000 |
| 22,400,000 | 25,600,000 | 28,800,000 | 32,000,000 | 35,200,000 |
| 23,100,000 | 26,400,000 | 29,700,000 | 33,000,000 | 36,300,000 |
| 23,800,000 | 27,200,000 | 30,600,000 | 34,000,000 | 37,400,000 |
| 24,500,000 | 28,000,000 | 31,500,000 | 35,000,000 | 38,500,000 |
| 25,200,000 | 28,800,000 | 32,400,000 | 36,000,000 | 39,600,000 |
| 25,900,000 | 29,600,000 | 33,300,000 | 37,000,000 | 40,700,000 |
| 26,600,000 | 30,400,000 | 34,200,000 | 38,000,000 | 41,800,000 |
| 27,300,000 | 31,200,000 | 35,100,000 | 39,000,000 | 42,900,000 |
| 28,000,000 | 32,000,000 | 36,000,000 | 40,000,000 | 44,000,000 |
| 28,700,000 | 32,800,000 | 36,900,000 | 41,000,000 | 45,100,000 |

*Fig. 19c*

D3     fx =(100-ROW(D3))*(20-COLUMN(D3))*1000

| | C |
|---|---|
| 1 | |
| 2 | Name |
| 3 | New Card Accounts |
| 4 | Total Card Accounts |
| 5 | Active Card Accounts |
| 6 | Card Accounts with Purchase Transaction |
| 7 | Card Accounts with Purchase or Cash Transaction |
| 8 | Card Accounts with Initial Load Transaction |
| 9 | Card Accounts with Reload Transaction |
| 10 | Card Accounts with Reload Transaction using Direct Deposit |
| 11 | Total Cards Associated with Total Card Accounts |
| 12 | Initial Load Amount |
| 13 | Initial Load Amount using Direct Deposit |
| 14 | Initial Load Amount using Cash |
| 15 | Reload Amount |
| 16 | Reload Amount using Direct Deposit |
| 17 | Reload Amount using Cash |
| 18 | Initial Load Counts |
| 19 | Initial Load Counts using Direct Deposit |
| 20 | Initial Load Counts using Cash |
| 21 | Reload Counts |
| 22 | Reload Counts using Direct Deposit |
| 23 | Reload Counts using Cash |
| 24 | Load Losses ($) |
| 25 | Fraud Charge-offs ($) |
| 26 | Other Charge-offs ($) |
| 27 | Load Losses (#) |
| 28 | Fraud Charge-offs (#) |
| 29 | Other Charge-offs (#) |
| 30 | Bill Payment Volume, Non-Visa |
| 31 | Bill Payment Volume, PIN-Less |
| 32 | Bill Payment Transaction Counts, Non-Visa |
| 33 | Bill Payment Transaction Counts, PIN-Less |

2000a

→ 20a

Calculations / VisaData / PartData /

|  | D | E | F | G | H |
|---|---|---|---|---|---|
|  | Prior Year | | | Prior Quarter | |
|  | Month 1 | Month 2 | Month 3 | Month 1 | Month 2 |
|  | 1,552,000 | 1,455,000 | 1,358,000 | 1,261,000 | 1,164,000 |
|  | 1,536,000 | 1,440,000 | 1,344,000 | 1,248,000 | 1,152,000 |
|  | 1,520,000 | 1,425,000 | 1,330,000 | 1,235,000 | 1,140,000 |
|  | 1,504,000 | 1,410,000 | 1,316,000 | 1,222,000 | 1,128,000 |
|  | 1,488,000 | 1,395,000 | 1,302,000 | 1,209,000 | 1,116,000 |
|  | 1,472,000 | 1,380,000 | 1,288,000 | 1,196,000 | 1,104,000 |
|  | 1,456,000 | 1,365,000 | 1,274,000 | 1,183,000 | 1,092,000 |
|  | 1,440,000 | 1,350,000 | 1,260,000 | 1,170,000 | 1,080,000 |
|  | 1,424,000 | 1,335,000 | 1,246,000 | 1,157,000 | 1,068,000 |
|  | 1,408,000 | 1,320,000 | 1,232,000 | 1,144,000 | 1,056,000 |
|  | 1,392,000 | 1,305,000 | 1,218,000 | 1,131,000 | 1,044,000 |
|  | 1,376,000 | 1,290,000 | 1,204,000 | 1,118,000 | 1,032,000 |
|  | 1,360,000 | 1,275,000 | 1,190,000 | 1,105,000 | 1,020,000 |
|  | 1,344,000 | 1,260,000 | 1,176,000 | 1,092,000 | 1,008,000 |
|  | 1,328,000 | 1,245,000 | 1,162,000 | 1,079,000 | 996,000 |
|  | 1,312,000 | 1,230,000 | 1,148,000 | 1,066,000 | 984,000 |
|  | 1,296,000 | 1,215,000 | 1,134,000 | 1,053,000 | 972,000 |
|  | 1,280,000 | 1,200,000 | 1,120,000 | 1,040,000 | 960,000 |
|  | 1,264,000 | 1,185,000 | 1,106,000 | 1,027,000 | 948,000 |
|  | 1,248,000 | 1,170,000 | 1,092,000 | 1,014,000 | 936,000 |
|  | 1,232,000 | 1,155,000 | 1,078,000 | 1,001,000 | 924,000 |
|  | 1,216,000 | 1,140,000 | 1,064,000 | 988,000 | 912,000 |
|  | 1,200,000 | 1,125,000 | 1,050,000 | 975,000 | 900,000 |
|  | 1,184,000 | 1,110,000 | 1,036,000 | 962,000 | 888,000 |
|  | 1,168,000 | 1,095,000 | 1,022,000 | 949,000 | 876,000 |
|  | 1,152,000 | 1,080,000 | 1,008,000 | 936,000 | 864,000 |
|  | 1,136,000 | 1,065,000 | 994,000 | 923,000 | 852,000 |
|  | 1,120,000 | 1,050,000 | 980,000 | 910,000 | 840,000 |
|  | 1,104,000 | 1,035,000 | 966,000 | 897,000 | 828,000 |
|  | 1,088,000 | 1,020,000 | 952,000 | 884,000 | 816,000 |
|  | 1,072,000 | 1,005,000 | 938,000 | 871,000 | 804,000 |

→ 20b

RawVisaData \ RawPartData / RawOutput

| I | J | K | L |
|---|---|---|---|
| ter | Current Quarter | | |
| Month 3 | Month 1 | Month 2 | Month 3 |
| 1,067,000 | 970,000 | 873,000 | 776,000 |
| 1,056,000 | 960,000 | 864,000 | 768,000 |
| 1,045,000 | 950,000 | 855,000 | 760,000 |
| 1,034,000 | 940,000 | 846,000 | 752,000 |
| 1,023,000 | 930,000 | 837,000 | 744,000 |
| 1,012,000 | 920,000 | 828,000 | 736,000 |
| 1,001,000 | 910,000 | 819,000 | 728,000 |
| 990,000 | 900,000 | 810,000 | 720,000 |
| 979,000 | 890,000 | 801,000 | 712,000 |
| 968,000 | 880,000 | 792,000 | 704,000 |
| 957,000 | 870,000 | 783,000 | 696,000 |
| 946,000 | 860,000 | 774,000 | 688,000 |
| 935,000 | 850,000 | 765,000 | 680,000 |
| 924,000 | 840,000 | 756,000 | 672,000 |
| 913,000 | 830,000 | 747,000 | 664,000 |
| 902,000 | 820,000 | 738,000 | 656,000 |
| 891,000 | 810,000 | 729,000 | 648,000 |
| 880,000 | 800,000 | 720,000 | 640,000 |
| 869,000 | 790,000 | 711,000 | 632,000 |
| 858,000 | 780,000 | 702,000 | 624,000 |
| 847,000 | 770,000 | 693,000 | 616,000 |
| 836,000 | 760,000 | 684,000 | 608,000 |
| 825,000 | 750,000 | 675,000 | 600,000 |
| 814,000 | 740,000 | 666,000 | 592,000 |
| 803,000 | 730,000 | 657,000 | 584,000 |
| 792,000 | 720,000 | 648,000 | 576,000 |
| 781,000 | 710,000 | 639,000 | 568,000 |
| 770,000 | 700,000 | 630,000 | 560,000 |
| 759,000 | 690,000 | 621,000 | 552,000 |
| 748,000 | 680,000 | 612,000 | 544,000 |
| 737,000 | 670,000 | 603,000 | 536,000 | utMetrics

| | C | D | E | F | G |
|---|---|---|---|---|---|
| | Display Name | | | | |
| | Offline | | | | |
| | Interlink ** | | | | |
| | Payments Volume | | | | |
| | ATM Cash | | | | |
| | Manual Cash | | | | |
| | Cashback | | | | |
| | Total Cash Volume | | | | |
| | Total Volume (Payments + Cash) | | | | |
| | Offline | | | | |
| | Interlink ** | | | | |
| | Payments Volume | | | | |
| | ATM Cash | | | | |
| | Manual Cash | | | | |
| | Cashback | | | | |
| | Total Cash Volume | | | | |
| | Total Volume (Payments + Cash) | | | | |
| | Offline | | | | |
| | Interlink ** | | | | |
| | Payments Volume | | | | |
| | ATM Cash | | | | |
| | Manual Cash | | | | |
| | Cashback | | | | |
| | Total Cash Volume | | | | |
| | Total Volume (Payments + Cash) | | | | | ons / VisaData / PartData / RawVisaData / RawPartData \ RawOutputMetrics /

*Fig. 21b*

PREPAID ACCOUNT PRODUCT PEER SCORING

CROSS REFERENCE TO RELATED APPLICATIONS

The application claims priority to, and the benefit of, U.S. Provisional Application Ser. No. 61/146,573, filed on Jan. 22, 2009, titled "Prepaid Account Product Peer Scoring," which is incorporated herein by reference.

FIELD

The invention is related to a payment processing system in which a transaction between a merchant and a consumer is conducted on an account issued by an issuer (i.e., an 'acquired transaction'), where the account is a prepaid account, where the transaction is acquired from the merchant by an acquirer for collection on the prepaid account from the issuer through a transaction handler or transaction processor, and where the consumer has funds on deposit in the prepaid account in order to pay for conducting the transaction with the merchant. More particularly, the invention is related to a transaction handler using a plurality of network devices to accumulate data from issuers and acquirer for a plurality of transaction on prepaid accounts, then rank the issuers by various metrics according to their respective transactions conducted on prepaid accounts as to quantities of such transactions and the currency quantities thereof.

BACKGROUND

Market segments for prepaid accounts are many and diverse, some of which are now known and some of which are yet to be determined. The present invention is applicable to all such prepaid account market segments. The market size can be indicator of importance for an issuer wishing to penetrate a prepaid account program for that market. Stated otherwise, an issuer may determine that the amount of money that is likely to be spent for goods and services in a particular segment of a market warrants an effort by the issuer to issue prepaid accounts that are intended to be used to conduct transactions for the goods and services in that specific market segment. For instance, an issuer may wish to issue: (i) general purpose prepaid accounts for use in the general purpose market which is estimated to be $0.66 US trillion in 2009; (ii) payroll prepaid accounts for the payroll market which is estimated to be $0.30 US trillion in 2009; (iii) gift prepaid account for the gift market which is estimated to be $0.21 US trillion in 2009; (iv) government prepaid accounts for the governments benefits market which is estimated to be $0.18 US trillion in 2009; (v) employee benefits prepaid accounts for the employee benefits market which is estimated to be $0.17 US trillion in 2009; and (vi) incentive prepaid accounts for the incentives market which is estimated to be $0.09 US trillion in 2009.

A prepaid gift card has as its target audience those consumers that are in a gift-giving situation whose benefits are (i) Flexibility: Recipient can buy what they want, when they want; (ii) Protection: Safer than cash and can be replaced if lost or stolen; and (iii) Choice: Transaction Handler Gift cards can be used anywhere that Transaction Handler Debit is accepted.

There is a prepaid youth or teen prepaid account transaction market where the target audience is parents with teenage children, and the benefits are (i) a powerful financial education tool to help teens learn budgeting; (ii) Parental controls with online tracking of purchases and spending limits; (iii) Independence to make responsible purchases without having to borrow a credit card or carry lots of cash; and (iv) Peace of mind for parents in case of emergencies, while their teen is traveling, or for everyday errands.

There is a prepaid travel prepaid account transaction market where the target audience is for U.S. travelers who travel both domestically and abroad, and the benefits include (i) A convenient replacement for Travelers Cheques; (ii) Safer than carrying cash; (iii) Obtain local currency at millions of Automatic Tell Machines (ATMs) around the world; (iv) Multiple cards allow travelers to share funds with their traveling companions; and (v) Emergency card and cash replacement anywhere in the world, usually within one business day.

There is a prepaid flexible spending account (FSA) transaction market. Here, the target audience for a FSA card are employees with FSA accounts, and the benefits include (i) Allows employees to access their pre-tax funds in either: (a) A Healthcare FSA to pay for eligible (healthcare goods and services, such as doctor/dentist visits, prescriptions, over-the-counter medications, eye-glasses) and (b) other out-of-pocket expenses not covered by insurance; and (ii) A Dependent Care FSA to pay for eligible childcare or adult dependent care expenses.

There is a prepaid Health Reimbursement Arrangement (HRA) Card transaction market. Here, the target audience for a HRA card are employees with access to HRA funds, and the benefits include (i) Allows consumers to access funds in their employer-funded HRA to pay for eligible healthcare expenses (the eligibility or which is determined by the employer) for themselves, their spouse and dependents; and (ii) Allows employers to have more say in how the funds can be used; (iii) there is no limit to the amount that employers can contribute to their employees' HRAs and contributions are not treated as taxable income.

There is a prepaid Health Savings Account (HAS) Card transaction market. Here, the target audience for a HSA card are consumers with HAS accounts, and the benefits include (i) Allows consumers to access pre-tax funds in their Health Savings Accounts to pay for eligible healthcare goods and services for themselves, their spouse and dependents; and (ii) Consumers must be covered by a qualified High Deductible Health Plan (HDHP) to qualify for an HSA and contributions to HSAs are subject to IRS maximums.

There is a prepaid Wellness Card transaction market. Here, the target audience for a Wellness Card are Consumers with Wellness benefits through their employer or health plan, and the benefits include (i) Allows rewarding of consumer with financial incentives for completing a specific task and/or participating in a program related to health and wellness; (ii) Allows for restrictive use to limit acceptance to Health and Medical merchants only.

There is a prepaid Insurance Card transaction market. Here, the target audience for a prepaid Insurance Card are insurance policy holders who have claims against an insurance company, and the benefits include (i) Allows convenient and cost-effective way for insurance carriers to pay claims to policy holders; (ii) Reduces costs associated with check writing, check replacement and fraud; and (iii) Benefits policy holders by receiving quick access to emergency funds and ongoing policy disbursements.

There is a prepaid Incentive Card transaction market for which there are five incentive types: employee incentive, trade/channel incentive, consumer rebate, consumer promotion, and loyalty. Here, the target audience is Employees/consumers receiving an incentive from corporations. Benefits: Allows corporations to provide incentive funds to consumers/employees through:
1. A rebate card that offers funds back on the purchase of goods or services
2 A consumer promotions card that offers funds as an incentive for completing a specific event
3. An employee incentive card for recognition rewards and sales bonuses
4. A channel incentives card paid to a dealer or distributor employees.
5. A loyalty rewards card to encourage loyal buying behavior.

Prepaid Government Card: Consumers receiving disbursements from a government agency; Benefits:
1. Allows consumers to access funds received from federal and state agencies
2. Allows government agencies to help eliminate check-related costs and fraud issues
3. Provides recipients greater security, convenience and purchasing power compared to cash and checks Prepaid Payroll Card: Target Audience: Private sector employees; Benefits:
1. Allows employers to compensate employees that do not have a bank account or direct deposit
2. Allows employees that do have direct deposit but want the card to manage funds or as a means to provide funds to a spouse or dependent Prepaid General Purpose Card: Target Audience: Underserved consumers who do not have access to a Government or Payroll card, but want to have card access; Benefits: Provides bankcard services to two types of underserved customers:
A. Unbanked consumer who does not have an account relationship with traditional financial institution, i.e. checking or savings account'
B. Underbanked consumer who does have account relationship with traditional but uses alternative providers such as check cashers;

Cross-Border Remittance Card: Target Audience: Consumers with family in another country; Benefits:
1. Allows convenient and secure method of transmitting money to family members in another country;
2. Reduces costs associated with other methods of sending funds remotely.

Prepaid Relocation Card: Target Audience: Business entities moving employees to a different city; Benefits:
1. Allows companies to reimburse employees efficiently and cost effectively
2. Reduces costs associated with writing checks or other methods of reimbursement.

Whether a participant in a particular prepaid account program is an issuer that issues prepaid accounts for the particular prepaid account program, such as a bank or credit union, or whether the participant is a big box merchant (e.g.; Macys, Walmart, Target, Kmart, Best Buy, etc.) that sponsors the particular prepaid account program while using an issuer to issue prepaid accounts for the particular prepaid account program, each such participant has a need to understand opportunities to better its participation in a segment of a market for prepaid account transactions. Moreover, it is desirable for such a participant to understand opportunities, by comparison to its peers, to issue prepaid accounts upon which transactions are to be conducted for goods and services within a particular segment of a particular market, where each prepaid account that is issued by the issuer will be activated by a consumer who will use the prepaid account to conduct such transactions with merchants who provide such goods and services in a segment of a market. The present disclosure addresses this need.

SUMMARY

Data from transactions conducted on prepaid accounts are accumulated for a participant in a prepaid account program and from its peers. Other data is also accumulated, including the number of account issued by each issuer for the participant (where the issuer and participant may or may not be the same) and of these, the number of the prepaid accounts that were activated by an account holder, an amount of currency loaded into each prepaid account, etc. The participants' prepaid account programs involve prepaid account transactions that are authorized, cleared and settled in an open system payment processing network that includes merchants and their acquirers, and a transaction handler for authorizing, clearing and settling the transactions that are conducted on prepaid accounts. In one implementation, performed by a machine, the accumulated data from the plurality of transactions is used to calculate a comparison between the participant and its peers. A report graphically depicting the comparisons between the participant and its peers is rendered. In another implementation, the comparisons between the participant and its peers include: (i) an average number of the transactions on the prepaid accounts per the number of the issued prepaid accounts; and (ii) an average currency amount of the transactions on the prepaid accounts per the number of the issued prepaid accounts.

In yet another implementation, the comparisons between the participant and its peers include: (i) a percentage of the activated prepaid accounts per the issued prepaid accounts; (ii) an average number of the transactions on the prepaid accounts; (iii) a product of (i) and (ii); and a product of (i), (ii) and the average currency amount of the transactions on the prepaid accounts.

BRIEF DESCRIPTION OF THE DRAWINGS

Implementations of the invention will become more apparent from the detailed description set forth below when taken in conjunction with the drawings, in which like elements bear like reference numerals.

FIG. 4 depicts a table showing different statistics for an issuer's prepaid accounts business relative to that of the average for its peers, a quantification of an opportunity, for each of these statistics, for the issuer's prepaid accounts business to change so as to meet the average for its peers, and a quantification of an opportunity, for each of these statistics, for the issuer's prepaid accounts business to change so as to exceed all of its peers;

FIGS. 5-14 depict exemplary tables each showing relative rankings for a plurality of issuers of prepaid accounts, where the issuer issues prepaid accounts to users in a segment of a market for each issuer is ranked relative to its peers, and where each transaction on each prepaid account can be processed in the payment processing network of FIG. 22;

FIGS. 15a through 15e each depict a graph of chronological quarter data for an issuer issuing prepaid accounts to users in a segment of a market;

FIGS. 16a-c depict an exemplary table of calculations used for the tables shown in FIGS. 17a-21b;

FIGS. 17a-20c depict exemplary tables each showing different accumulated statistics in each row for the columns of prior year, prior quarter, and current quarter, where the statistics are for an issuer of prepaid accounts, where the issuer issues prepaid accounts to users in a segment of a market, and where each transaction on each prepaid account can be processed in the payment processing network of FIG. 22;

FIGS. 21a-b is a table showing output locations for the tables of FIGS. 17a-20c.

DETAILED DESCRIPTION

Figure 1:
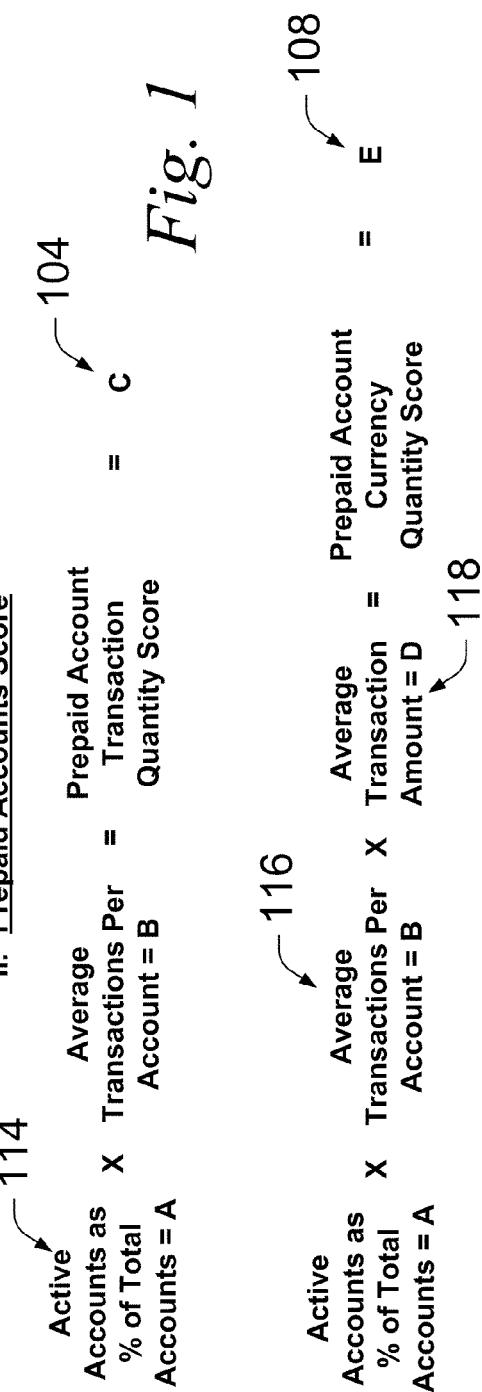
FIG. 1 depicts exemplary equations for computing an issuer's Automatic Teller Machine (ATM)/Debit Card Transaction Quantity Score, ATM/Debit Card Transaction Currency Quantity Score, Prepaid Account Transaction Quantity Score, and Prepaid Account Transaction Currency Quantity Score in an exemplary payment processing network of FIG. 22, where the issuer issues prepaid accounts to users in a segment of a market.

The invention addresses the need to rank a participant in a particular prepaid account program relative to its peers in a segment of a market in which in consumers can use prepaid accounts issued by an issuer to pay for transactions. In determining which participants of other prepaid account programs are the peers of the participant in the particular prepaid account program, a variety of categories can be used. The category can be a number of prepaid accounts that have been issued by issuers for the respective prepaid account programs, where that number falls between a predetermined lower and a predetermined upper threshold. The category can be a number of activated prepaid accounts for the prepaid account program, where that number falls between a predetermined lower threshold and a predetermined upper threshold. Other categories of the participants in the prepaid account programs, or a combination of the foregoing, can also be used.

Each such prepaid account is issued by the issuer, and each can be associated with a portable consumer payment device such as a prepaid card. These prepaid account market segments can be varied and diverse, and can be previously known or yet to be devised. These prepaid account can specifically designed, marketed and directed towards the conducting of transactions with merchants who deal in particular goods and services of a market or segment thereof. For instance, a prepaid card can be for (i) the purchase of gifts; (ii) for use by youth or teens; (iii) for buying travel and entertainment service; (iv) for the spending of funds in the prepaid account that correspond to employee benefits; (iv) for the spending of funds in the prepaid account that correspond to insurance benefits; (iv) for the spending of funds in the prepaid account that correspond to rewards or incentives (i.e., loyalty, rebate, and/or performance rewards); (iv) for use by underserved/unbanked/underbanked consumers to spend of funds in the prepaid account that correspond to state and government Disbursements, payroll, general purpose funds, and funds that are subsequently loaded in a prepaid account after an initial loading (i.e., reloadable prepaid accounts); (v) for purchasing supplies from a business supplier; (vi) for healthcare spending (i.e., Flexible Savings Accounts, Health Reimbursement Accounts, Health Savings Accounts); (vii) for purchases across a border (i.e., funding a prepaid account is a first currency for conducting transactions in a second, different currency); (viii) for spending related moving or relocation expenses, etc.

The data accumulated from various sources about a particular participant in a particular prepaid account program, and that of its peers, can be used for various purposes. In one instance, the participant might be an issuer that issues prepaid accounts, such as a bank or credit union. In another instance, the participant may be a big box merchant (e.g.; Walmart, Target, Kmart, etc.) that sponsors a particular prepaid account program. This participant may use an issuer to issuer prepaid accounts for the participant's prepaid account program. The participant may provide some of the data that is to be accumulated, whereas a transaction handler may acquire some of this data from issuers and acquirers through the processes of authorization, clearing and settlement activities as are related to prepaid account transactions. These data, when so accumulated, can be used to address at least four (4) different needs of the participant of the particular prepaid account program:

1. Compare the participant's performance metrics to that of its peers;
2. Identify opportunities for participants via metrics of:
    a. Average portfolio (See FIG. 2); and
    b. Other peers of the participants (See FIGS. 3-12).
3. See industry trends among peers of prepaid accounts in different market segments (see FIGS. 15a-15e, discussed below).
4. Identify and rank opportunities within a participant's prepaid program portfolio (see FIG. 4, discussed below).

For the general purpose prepaid card market segment, a particular participant in a particular prepaid account program (e.g.; an issuer, a partner in the particular prepaid account program that uses an issuer to issue prepaid accounts, etc.) may wish to determine a bench mark for its peers. In another case, the participant in the particular prepaid account program may want to bench mark its performance relative to its peers in the teen prepaid card market against its performance in the payroll prepaid card market. In some cases, data sensitivity and freedom of use of these data may require that the source of such data (e.g.; the issuer, the participant who uses an issuer to issue prepaid accounts for the prepaid program, the transaction handler in a payment processing network who is involved in authorizing, clearing and settling prepaid account transactions, etc.) to withhold the actual identify of the peers of the participant from the participant to whom peer performance metrics are being provided.

Figure 22:
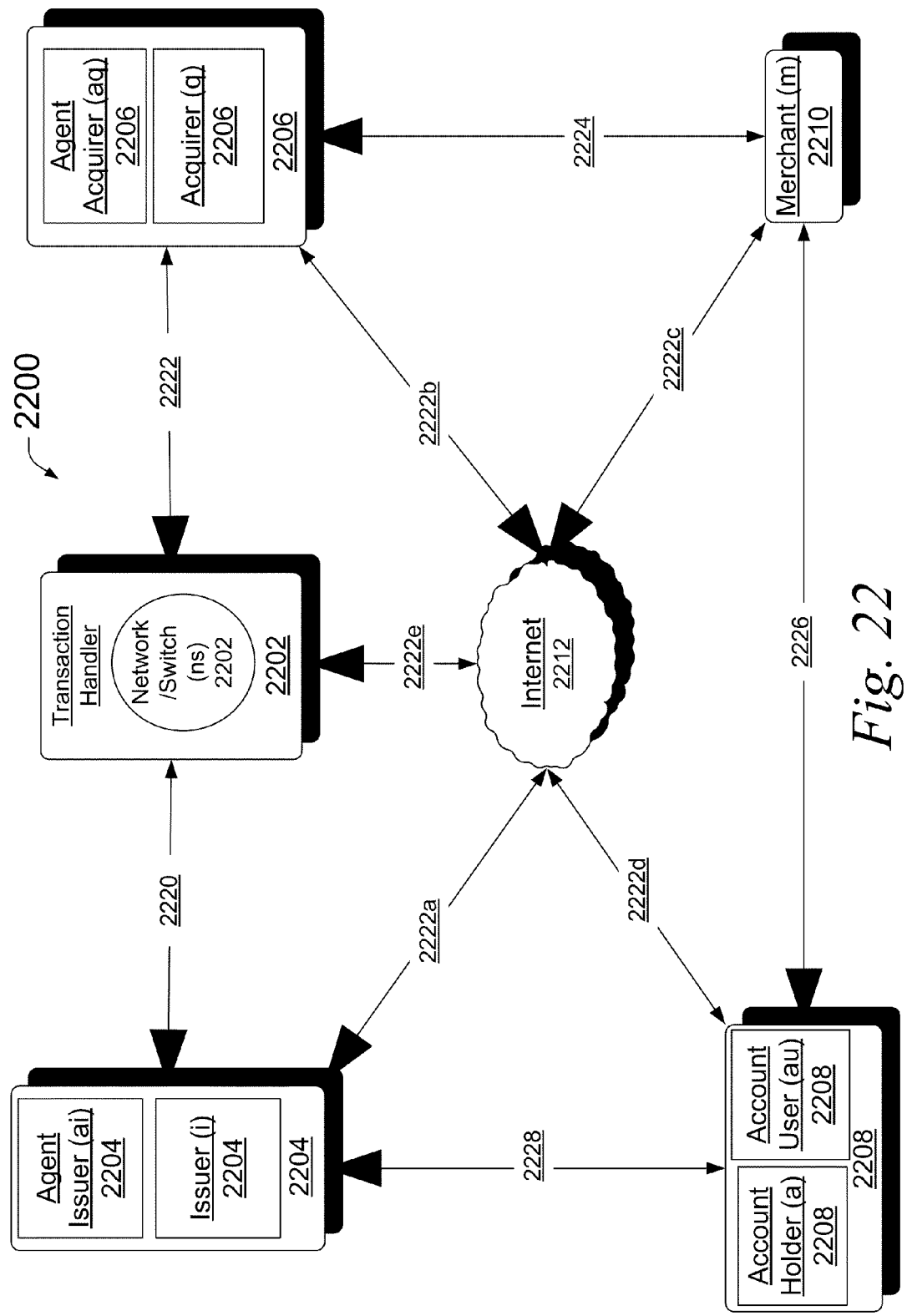
FIG. 22 illustrates an exemplary payment processing network.

In describing the Figures and the claims, with the exception of FIG. 22 which describes a payment processing network for processing prepaid transactions, the terms "issuer" and "participant" are used interchangeably. As such, the term 'issuer' will be understood to mean an issuer that issues prepaid accounts, such as a bank or credit union. In another instance, the term 'issuer' will be understood to mean a big box merchant (e.g.; Macys, Walmart, Target, Kmart, Best Buy, etc.) or other such merchant that is a sponsor of a particular prepaid account program, where the sponsor has a partner that is a bank or other financial institution, and where the partner issues prepaid accounts for the particular prepaid account program. Thus, the 'issuer' should be understood as a participant in a prepaid account program for whom data is to be accumulated and to whom peer performance metrics can be provided for its particular prepaid account program for comparison to that of its peers. As such, the particular participant in a particular prepaid account program, when provided with peer performance metrics for its particular prepaid account program, will better understand opportunities for the issuance of issue prepaid accounts in its particular prepaid account program. When so issued, the opportunities can be realized through those prepaid accounts which will be used to conduct transactions for goods and services within a particular segment of a particular market, where each prepaid account will be activated by a consumer who loads their prepaid account for use to conduct such transactions with merchants who provide such goods and services in a segment of a market.

FIG. 1 depicts exemplary equations 100 through 108 for an issuer of accounts upon which a user to whom the account was issued can conduct a transaction with a merchant. Equations 100 and 102 pertain to an issuer's Automatic Teller Machine (ATM)/Debit Cards, whereas Equations 102 and 104 pertain to an issuer's prepaid accounts.

Equation 100 computes an issuer's Automatic Teller Machine (ATM)/Debit Card Transaction Quantity Score by a multiplication of (i) the number of checking accounts issued by the issuer, (ii) the number of such checking accounts for which an ATM/Debit Card was also issued (penetration), (iii) the percentage of the issued ATM/Debit Cards having activity during the quarter, and (iv) the average number transactions per issued ATM/Debit Card for the quarter.

Equation 102 computes an issuer's ATM/Debit Card Currency Quantity Score by a multiplication of the result of Equation 100 by the average transaction amount for the quarter conducted using the issued ATM/Debit Cards.

Equation 104 computes an issuer's Prepaid Account Transaction Quantity Score ('C') by a multiplication of (i) the percentage of the issued prepaid accounts having activity during the quarter (114 or 'A'), and (ii) the average number transactions per issued prepaid account for the quarter ('B'). Note that, unlike checking accounts for which the penetration in issuing ATM/Debit Card can be less than 100%, the penetration is 100% for issuing prepaid accounts.

Equation 108 computes an issuer's Prepaid Account Transaction Currency Quantity Score ('E''') by a multiplication of the result of Equation 104 by the average transaction amount for the quarter (118 or 'D') conducted using the issued prepaid accounts.

For Equations 104 and 108, the exemplary payment processing network of FIG. 22 is used by the issuer who issues prepaid accounts to users in a segment of a market.

Figure 2:
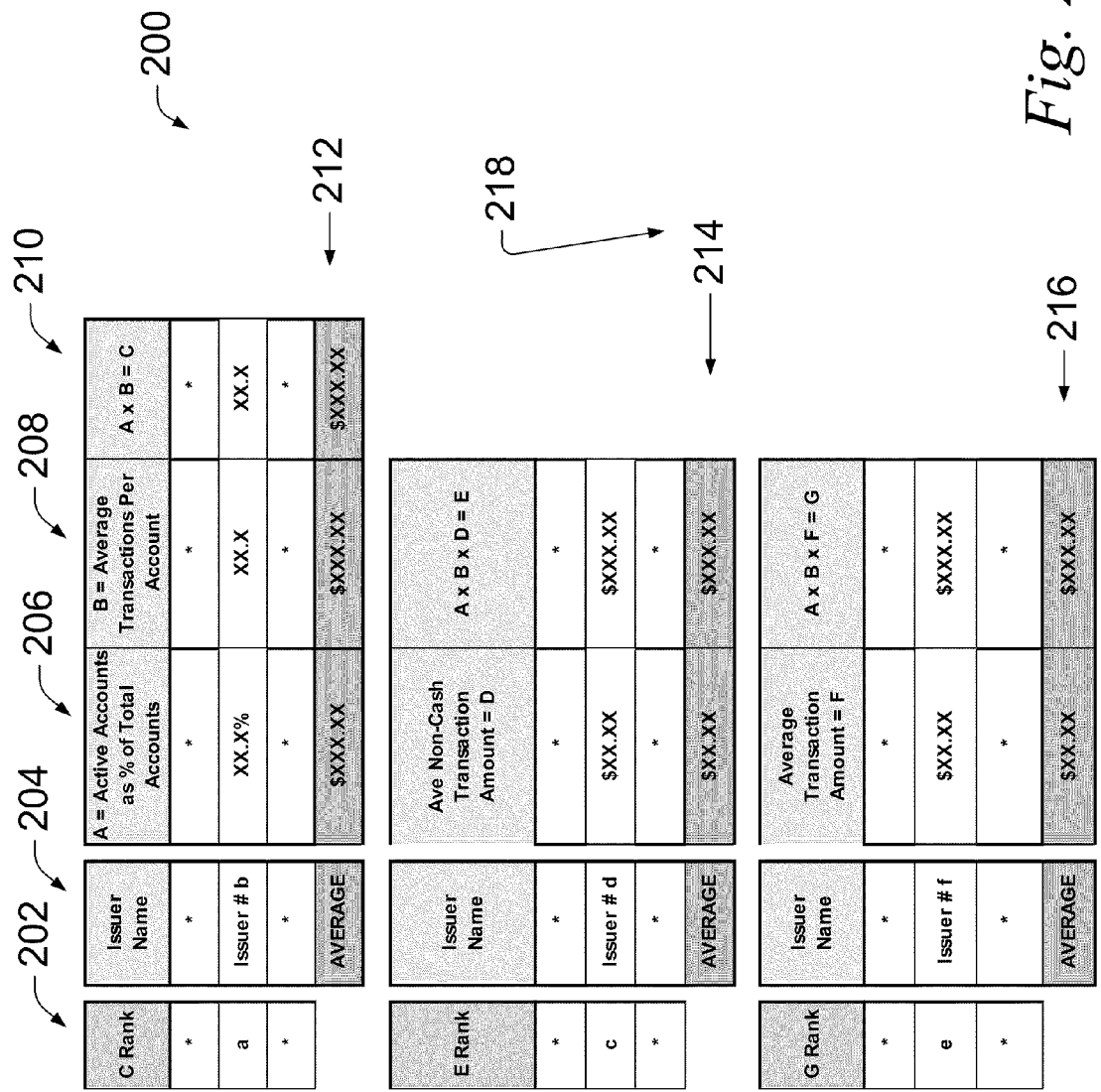
FIG. 2 exemplary tables showing three (3) relative rankings for a plurality of issuers of prepaid accounts, where those ranking take into account the number of prepaid accounts on which there had been at least one (1) transaction in the quarter, the average transactions per account, and the average transaction amount.

FIG. 2 depicts at 200 exemplary tables showing three (3) relative rankings of a portfolio average for a plurality of issuers of prepaid accounts: $1^{st}$: a multiplication result ('C Rank') at 202 of the number of prepaid accounts on which there had been at least one (1) transaction ('activity') in the quarter ('A'), and the average transactions per account ('B'), where C is totaled for all peer issuers at 204; $2^{nd}$: the multiplication result ('E') of A and B at 206, which is totaled for all peer issuers at 206; and $3^{rd}$: the multiplication result ('G Rank') of A, B and the Average Transaction Amount at 210, which is totaled for all peer issuers at 212.

In one implementation the C Rank of FIG. 2 may be depicted as:

$$\frac{\text{Accts. Issued}}{\text{Accts.}} * \frac{\text{Transaction Active}}{\text{Accts.}} = \frac{\text{Transactions}}{\text{Issued Accts.}}$$

$$= \text{Average transactions per issued account}$$

Or (Active Accounts/Issued Accounts)*Average Transactions Per Account=Average transactions per issued account In one implementation the G Rank of FIG. 2 may be depicted as:

$$C \text{ Rank} * \frac{\text{Currency Amounts}}{\text{Transactions}} = \frac{\text{Currency Amounts}}{\text{Issued Accounts}}$$

$$= Ave \text{ Currency } Amt \text{ per issued account}$$

Figure 3:
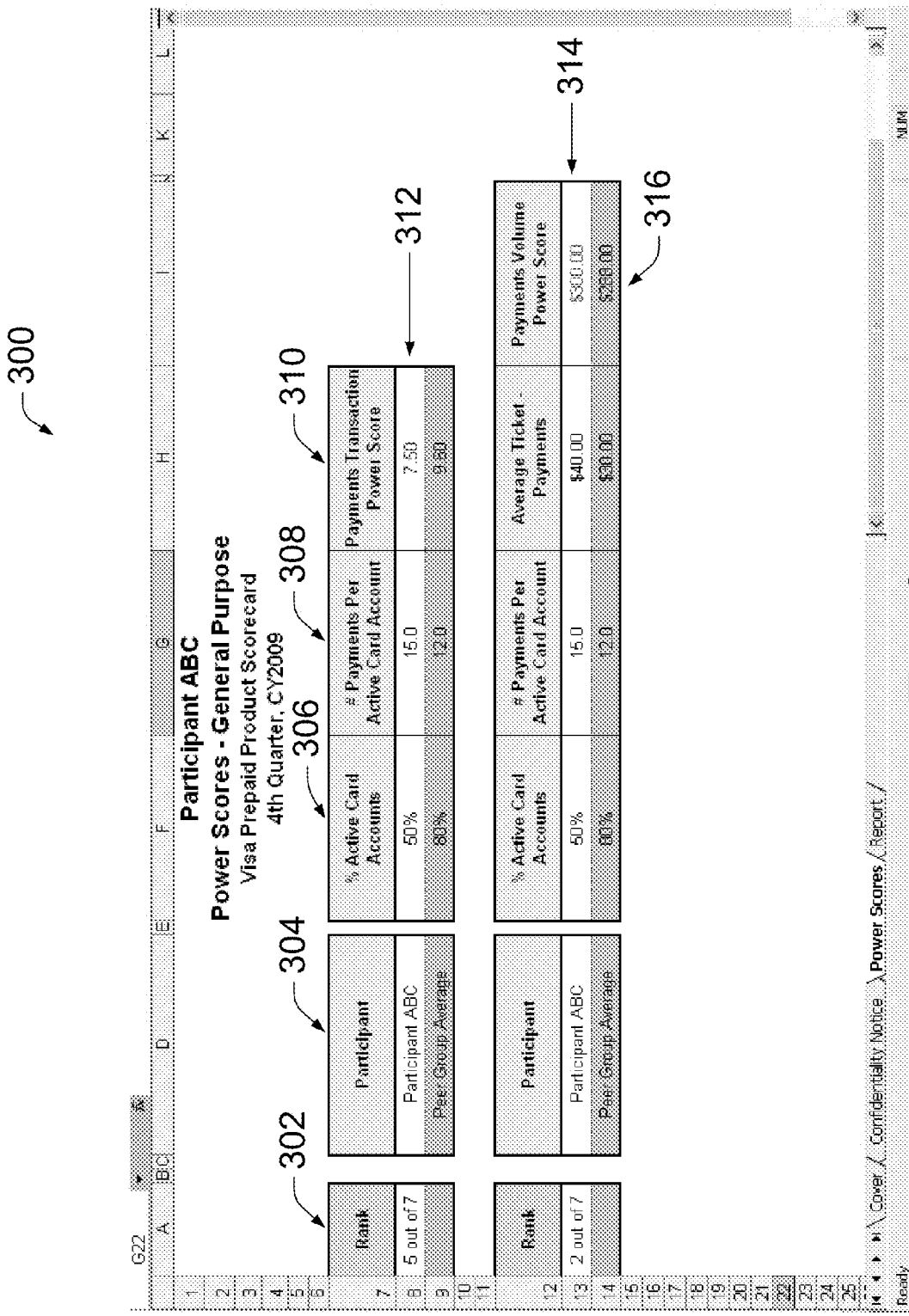
FIG. 3 depicts applied examples of two the three relative ranking seen in FIG. 2.
Figure 19A:

FIG. 3 depicts at 300 exemplary tables showing two (2) of the three (3) relative rankings depicted in FIG. 2 for one (1) participant, labeled "Participant ABC" that is an issuer of prepaid accounts that are categorized as "General Purpose" prepaid accounts. The table of FIG. 3 is labeled "Power Scores—General Purpose" and the depicted mock data is for the fourth quarter of calendar year 2010.

At the intersection of reference numbers 302 and 312, Participant ABC is shown to have a ranking of five (5) out of seven (7) prepaid account issuers as described below. At the intersection of reference numbers 302 and 314, Participant ABC is shown to have a ranking of two (2) out of seven (7) prepaid account issuers as described below. Note that each rank is set forth as being relative to seven (7) peers of Participant ABC, and that a peer is a prepaid account issuer that has similar predetermined characteristics to that of Participant ABC.

At the intersection of reference numbers 306 and 312, the percentage (%) of active prepaid accounts is given for Participant ABC and for its peer group average. An active prepaid account is considered to a prepaid account that has been issued by its issuer and has been activate for use by an account holder of the prepaid account. At the intersection of reference numbers 308 and 312, the average number of payments that have been made for each active prepaid account for the fourth quarter of calendar year 2010 is given for Participant ABC and for its peer group average. A payment can be on one (1) transaction that was conducted on the activated prepaid account with a merchant by the account holder of the prepaid account. At the intersection of reference numbers 310 and 312, a "Payments Transaction Power Score" is given for Participant ABC and for its peer group average. The Payments Transaction Power Score is calculated by multiplying the percentage (%) of active prepaid accounts by the average number of payments that have been made for each active prepare account. For convenience to the reader of the Power Scores—General Purpose table, since Participant ABC had a Payments Transaction Power Score of "7.50" that was below that of its peers ("9.60"), the rendering of "7.50" can be altered in intensity, font, font size, or color can be altered from that of the rendering of "9.60".

At the intersection of reference numbers 306 and 314, the percentage (%) of active prepaid accounts is given for Participant ABC and for its peer group average. At the intersection of reference numbers 308 and 314, the average number of payments that have been made for each active prepare account for the fourth quarter of calendar year 2010 is given for Participant ABC and for its peer group average. At the intersection of reference numbers 310 and 314, the average dollar amount of a transaction conducted on an active prepaid account during the fourth quarter of calendar year 2010 is given for Participant ABC and for its peer group average. At the intersection of reference numbers 316 and 314, a "Payments Volume Power Score" is given for Participant ABC and for its peer group average. The Payments Volume Power Score is calculated by multiplying the percentage (%) of active prepaid accounts by both the average number of payments that have been made for each active prepare account and the average dollar amount of a transaction conducted on an active prepaid account. For convenience to the reader of the Power Scores—General Purpose table, since Participant ABC had a Payments Volume Power Score that was $300, which was above that of its peers ($288.00), the rendering of "$300.00" can be altered in intensity, font, font size, or color from that of the rendering of "288.00".

FIG. 4 depicts a table 400 in a spread sheet format that is labeled "Visa Prepaid Scorecard Participant Opportunity Summary". In qualitative summary, table 500 shows the Participant growth opportunities for a participant in a prepaid account program and the ranking of those opportunities within the Participant's portfolio.

At reference number 402 is a column showing different the statistics of 'Activation', 'Usage', and 'Auth Rate' (prepaid transaction authorization rate) for an issuer's prepaid accounts business for a particular market segment's quarter-year performance.

The metric of Activation, which is numerically given in column 404, is the number of active prepaid accounts that have been issued by the issuer that have also been activated for use by an account holder of the prepaid account. The Activation Metric is also given for average of the issuer's peers and for the best of the issuer's peers. An Activation Metric is given for the difference between columns 404 and 406 as the Opportunity to Peer Average at column 410. The Opportunity to Peer Group Average at column 410 can be understood to mean an annualized additional currency volume (e.g.; US dollars) if the Participant were to improve this metric to the current Peer Group Average level, assuming all other metrics being constant. The Activation Metric in column 410 is $1,080,000,000, which is assumes that there one half million of the Participant's accounts that have been issued (500,000), If so, then the Opportunity to Peer Average=500,000*(30%)*15*$40 *12=$1,080,000,000; where 500,000 is the number of the Participant's accounts that have been issued, 30% is the increase in activated prepaid accounts 50% to 80%, $40 is the average currency amount for a transaction on a prepaid account, 15 is the average number of times that an activated prepaid account is used for in transactions per month, and 12 is the number of months in one (1) year. An Activation Metric is also given for the Opportunity to Best-in-Class at column 412. The Opportunity to Best-in-Class at column 412 should be understood to mean an annualized additional currency volume (e.g.; US dollars) if the Participant were to improve the metric to the current Best-In-Class level, assuming all other metrics are kept constant. The Opportunity to Best-in-Class for the Activation Metric at column 412 is $1,440,000,000=500,000*(40%)*15*$40*12; where 500,000 is the number of the Participant's accounts that have been issued, 40% is the increase in activated prepaid accounts from 50% to 90%, $40 is the average currency amount for a transaction on a prepaid account, 15 is the average number of times that an activated prepaid account is used for in transactions per month, and 12 is the number of months in one (1) year.

The metric of 'Usage', which is numerically given in column 404, is the number of active prepaid accounts that have been issued by the issuer that have also been used to conduct a transaction with a merchant by the account holder of the prepaid account. The Usage Metric is also given for an average of the issuer's peers and for the best of the issuer's peers. The Opportunity to Best-in-Class for the Usage Metric at column 412 is $600,000,000 =500,000*50%*5%*$40*12; where 500,000 is the number of the Participant's accounts that have been issued, 50% is the increase in activated prepaid accounts, 5% is the increase in usage of prepaid accounts, $40 is the average currency amount for a transaction on a prepaid account, 12 is the number of months in one (1) year.

The metric of 'Auth Rate', or authorization rate, which is numerically given in column 404, is seen in Table 400 in column 402. The authorization rate can be based on a plurality of different channels by which an account holder attempts to use a prepaid account to conduct a transaction with a merchant, where the channels can include those transactions that are conducted by the account holder face-to-face with a merchant, those transactions that are conducted by the account holder by mail order or telephone order place with a merchant, those transactions that are conducted by the account holder over the Internet with a merchant, those transactions that recur and are conducted by the account holder with a merchant. The authorization rate can be the number of times that an account holder attempted to use a prepaid account to conduct a transaction with a merchant and the transaction was authorized. Alternatively, the authorization rate can be the percentage of times that an account holder attempted to use a prepaid account to conduct a transaction with a merchant and the transaction was authorized as opposed not be authorized (e.g.; the transaction was only partially approved, was not authorized due to insufficient funds in the prepaid account, was not authorized because of a flag denoting that the prepaid account should not be honored for transactions, and other such non-authorization events). The Auth Metric is also given for an average of the issuer's peers and for the best of the issuer's peers at column 410. The Auth Rate Metric for Opportunity to Peer Group Average in column 410 is $385, 714,286; where 500,000*50%*15/70%=5,360,000 authorization count; and where 5,360,000*15%*$40*12=$385,714, 286; where 500,000 is a count of the number of prepaid account transactions for which an authorization was requested, 50% is the number of issued prepaid accounts that were activated, 15 is the average number of times that a prepaid account was used in a month, 70% means that 7 out of 10 prepaid account transactions were authorized, 5,360,000 is number of authorized prepaid transactions, 15% is the increased in the authorization rate, $40 is the average currency amount for a transaction on a prepaid account, 12 is the number of months in one (1) year.

An Auth Metric is also given for the Opportunity to Best-in-Class at column 412 as $514,285,714; where 500, 000*50%*15/70%=5,360,000; where 5,360,000*20%*$40*12 annualized=$514,285,714; where 500,000 is a count of the number of prepaid account transactions for which an authorization was requested, 50% is the number of issued prepaid accounts that were activated, 15 is the average number of times that a prepaid account was used in a month, 70% means that 7 out of 10 prepaid account transactions were authorized, 5,360,000 is number of authorized prepaid transactions, 20% is the increase in the authorization rate, $40 is the average currency amount for a transaction on a prepaid account, 12 is the number of months in one (1) year.

FIGS. 5-14 can be used to identify opportunities for a group of peer issuers in various prepaid account market segments (i.e., the prepaid gift account market segment, the prepaid travel and entertainment account market segment, the employee payroll prepaid account market segment, etc.) To do so, FIGS. 3-12 each show a table depicting, for a plurality of issuers, a relative ranking of each issuer. In each table, the issuers can be relative peers one to the others. As such, each Figure shows, progressively in the horizontal direction, for each issuer, the name of the issuer, the peer ranking of the issuer for the market segment performance variable on the vertical axis that is being measured, and the increase or decrease over the same quarter of the prior year for the market segment performance variable on the vertical axis that is being measured. The foregoing horizontal figures for each issuer being ranked are summarized at the horizontal right end of the table, by the number of issuers in the peer group, the peer group average, and the peer group best in the class of peers.

FIGS. 5-14 each depict, in their respective tables, a vertically listed set of market segment quarter-year performance variables that are each set forth for each issuer.

In FIG. 5, the vertically listed set of market segment quarter-year performance variables each pertain to volume metrics, including the amount in millions of dollars, the percent (%) Share of Total Prepaid Product X Volume (where X is the prepaid product market segment that was measured), the percent (%) of Year-on-Year (YoY) Quarterly Volume Growth, and the percent (%) of Quarterly Volume Growth Contribution. For each of the foregoing, the following further measurements are presented in a vertically listed set of market segment quarter-year performance variables:
  Payments
    Offline
    Interlink
    Payments Volume
  Cash
    ATM Cash
    Manual Cash
    Cashback
    Total Cash Volume
    Total Volume (Payments+Cash)

In FIG. 6, the vertically listed set of market segment quarter-year performance variables each pertain to transaction metrics, including the number of transaction in thousands, the percent (%) Share of Total Prepaid Product X Volume (where X is the prepaid product market segment that was measured), the percent (%) of Year-on-Year (YoY) Quarterly Volume Growth, and the percent (%) of Quarterly Volume Growth Contribution. For each of the foregoing, the following further measurements are presented in a vertically listed set of market segment quarter-year performance variables:
  Payments
    Offline
    Interlink
    Payments Volume
  Cash
    ATM Cash
    Manual Cash
    Cashback
    Total Cash Volume
    Total Volume (Payments+Cash)

In FIGS. 5 and 6, the phase "Interlink" is intended to represent a service for Electronic Funds Transfer at a merchant's Point of Sale terminal. By way of example, the Interlink can be the Interlink® service that is a division of Visa Inc., operating mainly in the USA. Contrary to a regular VISA check card purchase, an Interlink transaction is authenticated using a Personal Identification Number (PIN) and enables obtaining cash back (purchase+withdrawal) from the merchant. Interlink is provided by Visa® Debit Processing Service, a service to issuers for Visa payment products, that also provides processing support for Visa check card, Visa credit card, Visa prepaid cards, Visa/PLUS® ATM Network, Visa POS Check Service, Visa ePay. In addition, and ATM terminal driving and network gateways services.

In FIG. 7, the vertically listed set of market segment quarter-year performance variables each pertain to volume and interchange metrics, including:
  Average Ticket ($)
  Payments
    Offline
    Interlink
    Payments
  Cash
    ATM Cash
    Manual Cash
    Total Cash
  Total (Payments+Cash)
  Offline/Interlink Mix
  % Volume Mix
  % Transaction Mix
  Payment Volume (PV)/Cash Mix
  % Volume Mix
  % Transaction Mix
  Interchange
  Payments
    Offline
    Interlink
    Payments
  Cash
    ATM Cash
    Manual Cash
    Total Cash
  Total (Payments+Cash)

In FIG. 8, the vertically listed set of market segment quarter-year performance variables each pertain to account and card metrics, including:
  Account
  New Accounts ('000)
  Total Accounts ('000) (end of quarter)
  Active Accounts as % of Total Accounts
  Average Outstanding Balance per Total Accounts (end of quarter)
  Average Outstanding Balance per Active Accounts (end of quarter)
  Card
  New Cards ('000)
  New Cards as % of New Accounts
  Total Cards as % of Total Accounts In FIG. 8, it is intended that outstanding accounts are those that, at the end of the month, have had at least one (1) transaction ('activity') during the quarter, where those activities can be initial loads, reloads, payments and cash transactions.

In FIG. 9, the vertically listed set of market segment quarter-year performance variables each pertain to usage measurements, including:
  Load (Initial Load and Reloads, net of Reversals)
  Average Monthly Load Amount per Active Accounts
  Average Monthly Load Count per Active Accounts
  Average Load Amount per Load Count Spend $
Average Monthly Offline Volume per Active Accounts
Average Monthly Interlink Volume per Active Accounts
Average Monthly Payments Volume per Active Accounts
Average Monthly Cash Volume per Active Accounts
Average Monthly Total Sales Volume per Active Accounts
Spend Transactions
Average Monthly Offline Transactions per Active Accounts
Average Monthly Interlink Transactions per Active Accounts
Average Monthly Payments Transactions per Active Accounts
Average Monthly Cash Transactions per Active Accounts
Average Monthly Total Sales Transactions per Active Accounts In FIG. 9, it is intended that measurements of Active Accounts, Load Count, Load Amount, Payments, Cash, and Total Volume/Transactions are obtained by the transaction handler 2202 through the acquirers 2206 and issuers 2204. Also, active accounts are those that, at the end of the month, have outstanding accounts with activity during the quarter such as initial loads, reloads, payments and cash transactions.

In FIG. 10, the vertically listed set of market segment quarter-year performance variables each pertain to merchant group metrics, including Bill Payment, Other Retail, Supermarkets, Oil, and Remaining Merchants. Each of the foregoing merchant group metrics are further delineated by:
    % of Total Payments Volume
    % of Total Payments Transactions
    Average Ticket
    Blended Interchange Rate In FIG. 11, the vertically listed set of market segment quarter-year performance variables each pertain to merchant group metrics (payment volume) which is continued from FIG. 9, and include Quick Service Restaurants (QSRs), Restaurants, Direct Marketing, Other Travel and Entertainment, and All Others. Each of the foregoing merchant group metrics are further delineated by:
    % of Total Payments Volume
    % of Total Payments Transactions
    Average Ticket
    Blended Interchange Rate In FIG. 12, the vertically listed set of market segment quarter-year performance variables each pertain to acceptance channel measurements (payments volume), and include Face-to-Face, Mail Order/Telephone Order account purchases: Card-not-present (MOTO), Internet, and Recurring (i.e., monthly cable TV bill, phone bill, utility bill, car payment, etc.) Each of the foregoing acceptance channel measurements are further delineated by:
    Payments Volume as a % of Total Payments Volume; and
    Payments Transactions as a % of Total Payments Transactions
    Average Ticket.

In FIG. 13, the vertically listed set of market segment quarter-year performance variables each pertain to authorization measurements (payments volume), and include All Channels, Face-to-Face, MOTO, Internet, Recurring. Each of the foregoing authorization measurements are further delineated by:
    Approval;
    Partial Approval;
    Insufficient Funds;
    Do Not Honor; and
    All Other.

In FIG. 14, the vertically listed set of market segment quarter-year performance variables each pertain to Net Charge-Off Metrics, and include Net Charge-Off Amount per Active Account and Net Charge-Off Amount per Active Account. Each of the foregoing Net Charge-Off Metrics are further delineated by:
    Load Losses;
    Fraud Charge-Offs;
    Other Unrecoverable Losses & Negative Balances; and
    Total Charge-Offs.

FIGS. 15a-15e depict respective graphs of chronological quarter data for an issuer issuing prepaid accounts to users in a segment of a market, and an average for that of the issuer's peers, where the data for a progressive series of quarters is represented: (i) by a solid line for a particular issuer; and (ii) by a broken line for the peers of the particular issuer.

FIG. 15a is a measurement of quarter data from variable 'C' represented as 104 in FIG. 1. FIG. 15b is a measurement of quarter data from variable 'E' represented as 108 in FIG. 1. FIG. 15c is a measurement of quarter data from variable 'A' represented as 114 in FIG. 1. FIG. 15d is a measurement of quarter data from variable 'B' represented as 116 in FIG. 1. FIG. 15e is a measurement of quarter data from variable 'D' represented as 118 in FIG. 1.

FIGS. 1 through 15 can be constructed from prepaid account data from transactions accumulated and mined by a transaction handler in a payment processing system, where each such transaction, for example, can be an acquired transaction conducted with a merchant on an prepaid account issued by an issuer to a consumer. Example prepaid market segments include Gift, Teen, Travel, Employee Benefits, Underserved (Government, Payroll and General Purpose), Incentive, Insurance, Cross Border, Relocation, etc.)

As used in the Figures, both dollar amounts ($X) and percentages ($Y) are expressed as a letter or letter-number variable. These variables are intended to be calculated by the implementer of the implementations disclosed herein in accordance with the factual realities with which the implementer is dealing for each market and/or segment thereof.

Note that graphs, similar to those rendered in FIGS. 15a-15e, can be rendered to depicts two or more different time periods during which data has been accumulated from a plurality of transactions that were conducted on corresponding prepaid accounts within a payment processing system such as is depicted in FIG. 22 and described below. Such graphs, or numeral representations thereof, can show a series of pairs of matching time periods for sequential calendar years.

FIGS. 16a-c depict an exemplary table of calculations used for the tables shown in FIGS. 17a-21c. The calculations pertain to a participant who is an issuer that issuers prepaid accounts to users in a segment of a market. Each user can load funds into the prepaid account that was issued to them by the issuer. The user can then conduct transactions with merchants on their prepaid account. The last column of the table provides a formula, respectively, for each row for quarterly reporting that includes the following calculations for a participant:
    Total Offline Dollar Volume for the participant during current quarter/1,000,000
    Total Interlink Dollar Volume for the participant during current quarter/1,000,000
    Sum of Offline Dollar Volume and Interlink $ Volume for the participant during current quarter/1,000,000
    ATM Cash Dollar Volume for the current quarter/1,000,000
    Manual Cash Dollar Volume for the current quarter/1,000,000

Cashback Dollar Volume for the current quarter/1,000,000

Sum of ATM Cash Dollar, Manual Cash Dollar and Cashback Dollar for the current quarter/1,000,000

Sum of Total Payments Volume (Row 7) and Total Cash Volume (Row 11)/1,000,000

(Total Offline Dollar Volume for participant during current quarter)/(Total Offline Dollar Volume for participant during last year same quarter)−1.

FIGS. 17*a*-20*c* depict exemplary tables each showing different accumulated statistics in each row for the columns of prior year, prior quarter, and current quarter. The accumulated statistics are for an issuer of prepaid accounts who issues the prepaid accounts to users in a segment of a market. The calculations defined in the table of FIG. 16 use the accumulated statistics of FIGS. 17*a*-20*c*. Each transaction that is conducted on a prepaid account between the corresponding user and a merchant can be processed in the payment processing network of FIG. 22.

Figure 21A:
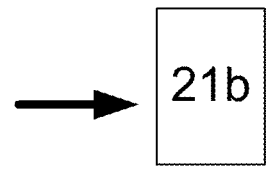

FIGS. 21*a*-*b* show a table showing output locations for the tables of FIGS. 17*a*-20*c*.

FIG. 21 is a table showing output locations for the tables of FIGS. 17-20.

Figure 23:
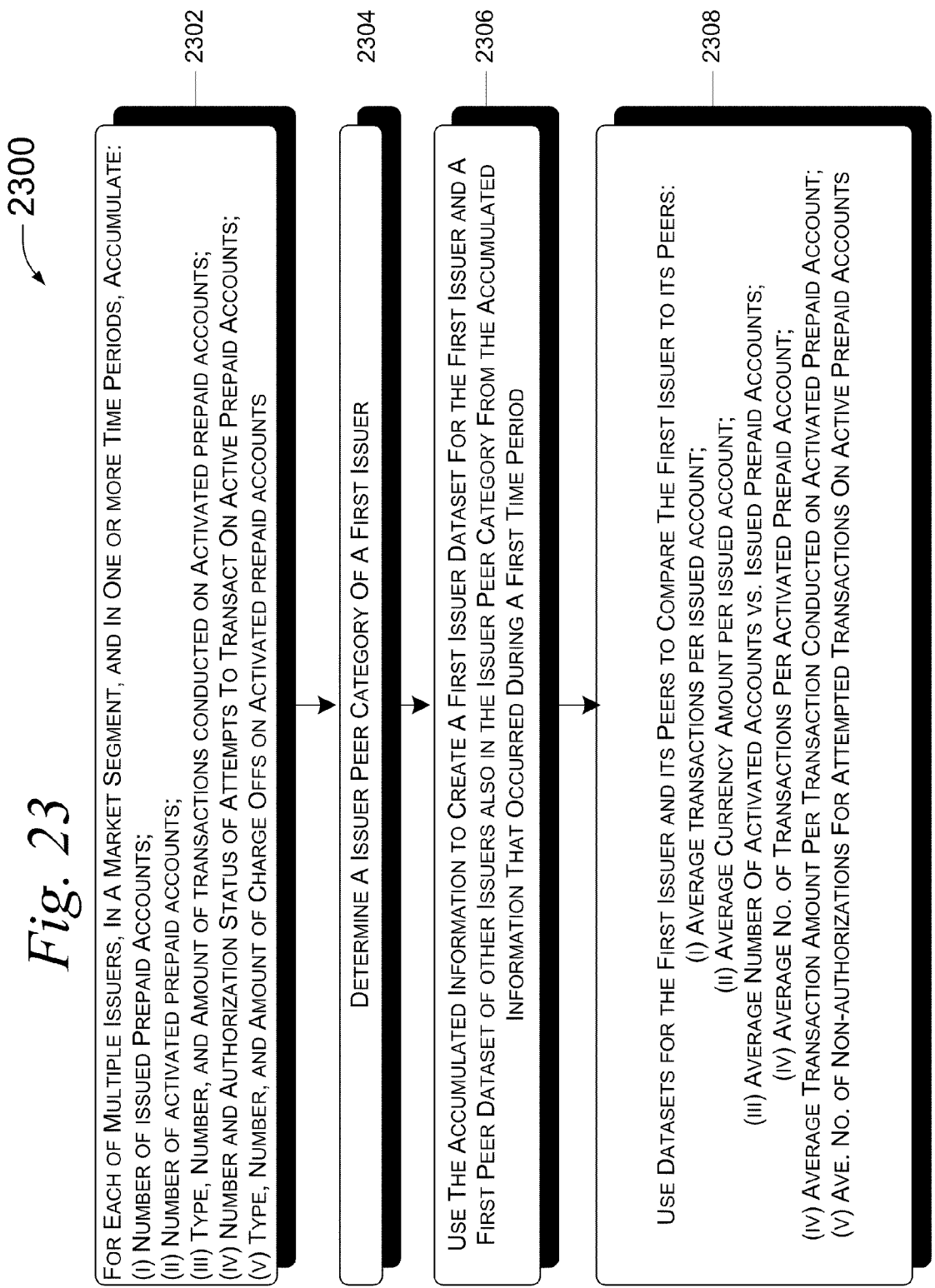
FIG. 23 is a flowchart depicting an exemplary process that is performed by hardware executing software, such as on a machine or plurality thereof.

FIG. 23 is a flowchart depicting an exemplary process 2300 have steps 2302 through 2308. Each step of process 2300 can be performed by hardware executing software.

In step 2302 of process 2300, for each of a plurality of issuers of prepaid accounts, within a particular segment of a market segment, and in one or more time periods, information is accumulated as to (i) the number prepaid accounts that the issuer has issued; (ii) the number of the issuer's issued prepaid accounts that have been activated; (iii) the type, number, and currency amount of transactions that were conducted on activated prepaid accounts; (iv) the number and authorization status of attempts to transact on issuer's active prepaid accounts; and (v) the type, number, and amount of charge offs applicable to the issuer's activated prepaid accounts. Of course other data for each such issuer can also be accumulated. Transactions from which the information is accumulated can occur in an open system payment processing network and example of which is depicted in FIG. 22 which is described below.

In step 2304, a particular issuer, and its peers, are determined for use in process 2300.

In step 2306 of process 2300, datasets are created for the particular issuer and for its peers from the accumulated information.

In step 2308 of process 2300, the created datasets are use to generate reports for the particular issuer and its peers. These reports can include numerical comparisons of the particular issuer to that of its peers, such as: (i) The average transactions per issued account; (ii) average currency amount per issued account; (iii) average number of activated accounts vs. issued prepaid accounts; (iv) average no. of transactions per activated prepaid account; (iv) average transaction amount per transaction conducted on activated prepaid account; (v) ave. no. of non-authorizations for attempted transactions on active prepaid accounts; (vi) etc.

By way of example of step 2308 of process 2300, the created datasets can be used to generate and graphically reports that compare the particular issuer of prepaid accounts to its peers in numerical comparisons of: (i) a 'Payments Transaction Power Score' and a 'Payments Volume Power Score' as described herein with respect to FIG. 3; and (iii) 'Activation', 'Usage', 'Ticket', and 'Auth Rate' for an issuer's prepaid accounts business for a particular market segment's quarter-year performance for both the Peer Average and the Best-In-Class with a quantified opportunities for these as described herein with respect to FIG. 4.

Payment Processing System.

FIG. 22 illustrates an exemplary payment processing system 2200, depicting a general environment in which a merchant (m) 2210 can conduct a transaction for goods and/or services with an account user (au) on an account (i.e., a prepaid account) issued to an account holder (a) 2208 by an issuer (i) 2204, where the processes of paying and being paid for the transaction are coordinated by a transaction handler 2202. The transaction includes participation from different entities that are each a component of the payment processing system 2200.

Payment processing system 2200 has a plurality of merchants 2210 that includes merchant (1) 2210 through merchant (M) 2210, where M can be up to and greater than an eight digit integer.

Payment processing system 2200 has a plurality of prepaid accounts 2208 each of which is held by a corresponding account holder (1) 2208 through account holder (A) 2208, where A can be up to and greater than a ten eight digit integer.

Payment processing system 2200 includes account user (1) 2208 through account user (AU) 2208, where AU can be as large as a ten digit integer or larger. Each account user (au) conducts a transaction for goods and/or services with merchant (m) 2210 using an account (i.e., a prepaid account) that has been issued by an issuer (i) 2204 to a corresponding account holder (a) 2208. Data from the transaction on the account is collected by merchant (m) and forwarded to a corresponding acquirer (a) 2206. Acquirer (a) 2206 forwards the data to transaction handler 2202 who facilitates payment for the transaction from the prepaid account issued by the issuer (i) 2204 to account holder (a) 2208.

Payment processing system 2200 has a plurality of issuers 2204. Each issuer (i) 2204 may be assisted in processing one or more transactions by a corresponding agent issuer (ai) 2204, where 'i' can be an integer from 1 to I, where 'ai' can be an integer from 1 to AI, and where I and AI can be as large as an eight digit integer or larger.

Payment processing system 2200 has a plurality of acquirers 2206. Each acquirer (q) 2206 may be assisted in processing one or more transactions by a corresponding agent acquirer (aq) 2204, where 'q' can be an integer from 1 to Q, where aq can be an integer from 1 to AQ, and where Q and AQ can be as large as a eight digit integer or larger.

Payment processing system 2200 has a transaction handler 2202 to process a plurality of transactions. The transaction handler 2202 can include one or a plurality or networks and switches 2202. Each network/switch (ns) 2202 can be a mainframe computer in a geographic location different than each other network/switch (ns) 2202, where 'ns' is an integer from one to NS, and where NS can be as large as a four digit integer or larger.

Dedicated communication systems 2220, 2222 (i.e., private communication network(s)) facilitate communication between the transaction handler 2202 and each issuer (i) 2204 and each acquirer (a) 2206. The Internet 2212, via e-mail, the World Wide Web, cellular telephony, and/or other optional public and private communications systems, can facilitate communications 2222*a*-2222*e* among and between each issuer (i) 2204, each acquirer (a) 2206, each merchant (m) 2210, each account holder (a) 2208, and the transaction handler 2202. Alternatively and optionally, one or more dedicated communication systems 2224, 2226, and 2228 can facilitate respective communications between each acquirer (a) 2206 and each merchant (m) 2210, each merchant (m) and each account holder (a) 2208, and each account holder (a) 2208 and each issuer (i) 2204, respectively.

Each acquirer (q) 2206 may be assisted in processing one or more transactions by a corresponding agent acquirer (aq) 2204, where 'q' can be an integer from 1 to Q, where aq can be an integer from 1 to AQ, and where Q and AQ can be as large as a eight digit integer or larger.

Merchant (m) 2210 may be a person or entity that sells goods and/or services. Merchant (m) 2210 may also be, for instance, a manufacturer, a distributor, a retailer, a load agent, a drugstore, a grocery store, a gas station, a hardware store, a supermarket, a boutique, a restaurant, or a doctor's office. In a business-to-business setting, the account holder (a) 2208 may be a second merchant making a purchase from another merchant (m) 2210. Merchant (m) 2210 may utilize at least one point-of-sale terminal (POS) that can communicate with acquirer (a) 2206, transaction handler 2202, or issuer (i) 2204. Thus, the POS terminal is in operative communication with the payment processing system 2200.

Typically, a transaction begins with account user (au) 2208 presenting a portable consumer device to merchant (m) 2210 to initiate an exchange for a good or service. The portable consumer device may be associated with an account (e.g., a prepaid account) of account holder (a) 2208 that was issued to the account holder (a) 2208 by issuer (i) 2204.

The portable consumer device may be in a form factor that can be a payment card, a gift card, a smartcard, a smart media, a payroll card, a healthcare card, a wrist band, a machine readable medium containing account information, a keychain device, such as a SPEEDPASS® device commercially available from ExxonMobil Corporation, or a supermarket discount card, a cellular phone, personal digital assistant, a pager, a security card, an access card, a wireless terminal, or a transponder. The portable consumer device may include a volatile or non-volatile memory to store information such as the account number or an account holder (a) 2208's name.

Merchant (m) 2210 may use the POS terminal to obtain account information, such as a number of the account of the account holder (a) 2208, from the portable consumer device. The portable consumer device may interface with the POS terminal using a mechanism including any suitable electrical, magnetic, or optical interfacing system such as a contactless system using radio frequency or magnetic field recognition system or contact system such as a magnetic stripe reader. The POS terminal sends a transaction authorization request to the issuer (i) 2204 of the account corresponding to the portable consumer device. Alternatively, or in combination, the portable consumer device may communicate with issuer (i) 2204, transaction handler 2202, or acquirer (a) 2206.

Issuer (i) 2204 may authorize the transaction using transaction handler 2202. Transaction handler 2202 may also clear the transaction. Authorization includes issuer (i) 2204, or transaction handler 2202 on behalf of issuer (i) 2204, authorizing the transaction in connection with issuer (i) 2204's instructions such as through the use of business rules. The business rules could include instructions or guidelines from transaction handler 2202, account holder (a) 2208, merchant (km) 2210, acquirer (a) 2206, issuer (i) 2204, a related financial institution, or combinations thereof. Transaction handler 2202 may maintain a log or history of authorized transactions. Once approved, merchant (m) 2210 will record the authorization, allowing account user (au) 2208 to receive the good or service from merchant (m) or an agent thereof.

Merchant (m) 2210 may, at discrete periods, such as the end of the day, submit a list of authorized transactions to acquirer (a) 2206 or other transaction related data for processing through the payment processing system 2200. Transaction handler 2202 may compare the submitted authorized transaction list with its own log of authorized transactions. If a match is found, transaction handler 2202 may route authorization transaction amount requests from the corresponding acquirer (a) 2206 to the corresponding issuer (i) 2204 involved in each transaction. Once acquirer (a) 2206 receives the payment of the authorized transaction amount from issuer (i) 2204, acquirer (a) 2206 can forward the payment to merchant (m) 2210 less any transaction costs, such as fees for the processing of the transaction. If the transaction involves a debit or pre-paid card, acquirer (a) 2206 may choose not to wait for the issuer (i) 2204 to forward the payment prior to paying merchant (m) 2210.

There may be intermittent steps in the foregoing process, some of which may occur simultaneously. For example, acquirer (a) 2206 can initiate the clearing and settling process, which can result in payment to acquirer (a) 2206 for the amount of the transaction. Acquirer (a) 2206 may request from transaction handler 2202 that the transaction be cleared and settled. Clearing includes the exchange of financial information between the issuer (i) 2204 and the acquirer (a) 2206 and settlement includes the exchange of funds. Transaction handler 2202 can provide services in connection with settlement of the transaction. The settlement of a transaction includes depositing an amount of the transaction settlement from a settlement house, such as a settlement bank, which transaction handler 2202 typically chooses, into a clearinghouse, such as a clearing bank, that acquirer (a) 2206 typically chooses. Issuer (i) 2204 deposits the same from a clearinghouse, such as a clearing bank, which issuer (i) 2204 typically chooses, into the settlement house. Thus, a typical transaction involves various entities to request, authorize, and fulfill processing the transaction.

Payment processing system 2200 will preferably have network components suitable for scaling the number and data payload size of transactions that can be authorized, cleared and settled in both real time and batch processing. These include hardware, software, data elements, and storage network devices for the same. Examples of payment processing system 2200 include those operated, at least in part, by American Express, Master Card, Discover Card, First Data Corporation, Diners Club, and Visa Inc., and agents of the foregoing.

Each network/switch (ns) 2202 can include one or more data centers for processing transactions, where each transaction can include up to 100 kilobytes of data or more. The data corresponding to the transaction can include information about the types and quantities of goods and services in the transaction, information about the account holder (a) 2208, the account user (au) 2208, the merchant (m) 2210, tax and incentive treatment(s) of the goods and services, coupons, rebates, rewards, loyalty, discounts, returns, exchanges, cashback transactions, etc.

By way of example, network/switch (ns) 2202 can include one or more mainframe computers (i.e., one or more IBM mainframe computers) for communications over systems 2220, 2222, one or more server farms (i.e., one or more Sun UNIX Superservers), where the mainframe computers and server farms can be in diverse geographic locations.

Each issuer (i) 2204 (or agent issuer (ai) 2204 thereof) and each acquirer (a) 2206 (or agent acquirer (aq) 2206 thereof) can use or more router/switch (i.e., Cisco routers/switches) to communicate with each network/switch (ns) 2202 via dedicated communication systems 2220, 2222, respectively.

Transaction handler 2202 stores information about transactions processed through payment processing system 2200 in data warehouses such as may be incorporated as part of the plurality of networks/switches 2202. This information can be data mined. The data mining transaction research and modeling can be used for advertising, account holder and merchant loyalty incentives and rewards, fraud detection and prediction, and to develop tools to demonstrate savings and efficiencies made possible by use of the payment processing system 2200 over paying and being paid by cash, checks, or other traditional payment mechanisms.

The VisaNet® system is an example component of the transaction handler 2202 in the payment processing system 2200. Presently, the VisaNet® system is operated in part by Visa Inc. As of 2007, the VisaNet® system Inc. was processing around 300 million transaction daily, on over 1 billion accounts used in over 170 countries. Financial instructions numbering over 16,000 connected through the VisaNet® system to around 30 million merchants. In 2007, around 81 billion transactions for about 4 trillion U.S. dollars were cleared and settled through the VisaNet® system, some which involved a communication length of around 24,000 miles in around two (2) seconds.

The steps, methods, processes, and devices described in connection with the implementations disclosed herein, are made with reference to the Figures, in which like numerals represent the same or similar elements. While described in terms of the best mode, it will be appreciated by those skilled in the art that the description is intended to cover alternatives, modifications, and equivalents as may be included within the spirit and scope of the invention as defined by the appended claims and their equivalents as supported by the following disclosure and drawings.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed implementations is provided to enable any person of ordinary skill in the art to make or use the disclosure. Various modifications to these implementations will be readily apparent to those of ordinary skill in the art, and the generic principles defined herein may be applied to other implementations without departing from the spirit or scope of the disclosure. Thus, the disclosure is not intended to be limited to the implementations shown herein but is to be accorded the widest scope consistent with the principles and novel features disclosed herein.

What is claimed is:

1. A method comprising a plurality of steps each being performed by hardware executing software, wherein the steps include:
    accumulating data via a computer from a plurality of transactions each of which is conducted on a corresponding issued prepaid account issued by an issuer that was activated by an account holder, wherein the issuer is within a payment processing system that includes a transaction handler processing the transaction for both a merchant and processing other said transactions for other said merchants, each said merchant submitting the corresponding said transaction to a corresponding acquirer for processing by the transaction handler who requests the issuer of the corresponding said prepaid account to obtain payment for the corresponding said transaction from the corresponding said prepaid account and for which the issuer forwards the payment from the prepaid account to the transaction handler who forwards the payment to the acquirer to pay the merchant for the corresponding said transaction;
    calculating via a computer, from the accumulated data for both one said issuer in a category of said issuers and for other said issuers also in the category, a Payments Transaction Power Score between the one said issuer in the category of said issuers and the other said issuers in the category; and
    rendering a report graphically via a computer depicting the Payments Transaction Power Score.

2. The method as defined in claim 1, wherein the Payments Transaction Power Score further comprises an average number of the transactions on the prepaid accounts.

3. The method as defined in claim 1, wherein the Payments Transaction Power Score further comprises an average currency amount of the transactions on the prepaid accounts.

4. The method as defined in claim 1, wherein the Payments Transaction Power Score further comprises an average number of activated accounts per the number of issued prepaid accounts.

5. The method as defined in claim 1, wherein the Payments Transaction Power Score further comprises an average number of the transactions on the prepaid accounts.

6. The method as defined in claim 1, wherein the Payments Transaction Power Score further comprises an average transaction amount for the transactions conducted on the activated prepaid accounts.

7. The method as defined in claim 1, wherein the Payments Transaction Power Score further comprises an average number of non-authorizations for attempts to conduct the transactions on active prepaid accounts.

8. The method as defined in claim 1, wherein the rendered report graphically depicting the Payments Transaction Power Score comprises a graph depicting the Payments Transaction Power Score for each of at least two different time periods during which the data was accumulated from the plurality of the transactions that were conducted on the corresponding prepaid accounts within the payment processing system.

9. The method as defined in claim 1, wherein the steps further comprise repeating the calculating for a series of pairs of matching time periods for sequential calendar years, whereby the rendered report respectively depicts the Payments Transaction Power Score for said pair of matching time periods for sequential calendar years.

10. The method as defined in claim 1, wherein the category is selected from the group consisting of:
    the number of issued prepaid accounts that is between a predetermined lower and a predetermined upper threshold;
    the number of activated prepaid accounts that is between a predetermined lower threshold and a predetermined upper threshold; and
    a combination of the foregoing.

11. The method as defined in claim 1, wherein the Payments Transaction Power Score that is depicted is selected from the group consisting of:
    payments for the transactions of the prepaid accounts that are offline transactions;
    payments for the transactions of the prepaid accounts that are Interlink transactions; and
    a combination of the foregoing.

12. The method as defined in claim 1, wherein the Payments Transaction Power Score that is depicted is selected from the group consisting of:
    the transactions of the prepaid accounts that involve cash from an Automated Teller machine (ATM);

the transactions of the prepaid accounts that involve manually giving cash;
the transactions of the prepaid accounts that the account holder receiving cash back; and
a combination of the foregoing.

13. The method as defined in claim 1, wherein the Payments Transaction Power Score that is depicted is selected from the group consisting of:
the transactions of the prepaid accounts that involve a loss of a currency amount loaded onto the corresponding prepaid account;
the transactions of the prepaid accounts that involve a fraud charge off;
the transactions of the prepaid accounts that involve an unrecoverable loss; and
the transactions of the prepaid accounts that involve a negative balance of the corresponding prepaid account.

14. The method as defined in claim 1, wherein the Payments Transaction Power Score that is depicted is selected from the group consisting of the transactions of the prepaid accounts that a channel selected from the group consisting of face-to-face transactions, mail order transactions, telephone transactions, Internet transactions; and recurring transactions.

15. The method as defined in claim 14, wherein, for each said channel, the Payments Transaction Power Score that is depicted is selected from the group consisting of the transactions of the prepaid accounts that are approved, the transactions of the prepaid accounts that are partially approved, and the transactions of the prepaid accounts that are not approved.

16. A non-transitory computer-readable medium comprising a set of instructions that cause a computer to perform the method of:
accumulating data via a computer from a plurality of transactions each of which is conducted on a corresponding issued prepaid account issued by an issuer that was activated by an account holder, wherein the issuer is within a payment processing system that includes a transaction handler processing the transaction for both a merchant and processing other said transactions for other said merchants, each said merchant submitting the corresponding said transaction to a corresponding acquirer for processing by the transaction handler who requests the issuer of the corresponding said prepaid account to obtain payment for the corresponding said transaction from the corresponding said prepaid account and for which the issuer forwards the payment from the prepaid account to the transaction handler who forwards the payment to the acquirer to pay the merchant for the corresponding said transaction;
calculating via a computer, from the accumulated data for both one said issuer in a category of said issuers and for other said issuers also in the category, a Payments Transaction Power Score between the one said issuer in the category of said issuers and the other said issuers in the category; and
rendering a report graphically via a computer depicting the Payments Transaction Power Score.

17. A method comprising a plurality of steps each being performed by hardware executing software, wherein the steps include:
accumulating data from a plurality of transactions each of which is conducted on a corresponding issued prepaid account issued by an issuer that was activated by an account holder, wherein the issuer is within a payment processing system that includes a transaction handler computer processor for processing the transaction for both a merchant and processing other said transactions for other said merchants, each said merchant submitting the corresponding said transaction to a corresponding acquirer for processing by the transaction handler who requests the issuer of the corresponding said prepaid account to obtain payment for the corresponding said transaction from the corresponding said prepaid account and for which the issuer forwards the payment from the prepaid account to the transaction handler who forwards the payment to the acquirer to pay the merchant for the corresponding said transaction;
calculating, from the accumulated data for both one said issuer in a category of said issuers and for other said issuers also in the category, a plurality of Payments Transaction Power Scores between the one said issuer in the category of said issuers and the other said issuers in the category, wherein the plurality of Payments Transaction Power Scores include:
an average number of the transactions on the prepaid accounts per the number of the issued prepaid accounts; and
an average currency amount of the transactions on the prepaid accounts per the number of the issued prepaid accounts; and
rendering a report graphically depicting the plurality of Payments Transaction Power Scores.

18. A non-transitory computer-readable medium comprising a set of instructions that cause a computer to perform the method of:
accumulating data from a plurality of transactions each of which is conducted on a corresponding issued prepaid account issued by an issuer that was activated by an account holder, wherein the issuer is within a payment processing system that includes a transaction handler computer processor for processing the transaction for both a merchant and processing other said transactions for other said merchants, each said merchant submitting the corresponding said transaction to a corresponding acquirer for processing by the transaction handler who requests the issuer of the corresponding said prepaid account to obtain payment for the corresponding said transaction from the corresponding said prepaid account and for which the issuer forwards the payment from the prepaid account to the transaction handler who forwards the payment to the acquirer to pay the merchant for the corresponding said transaction;
calculating, from the accumulated data for both one said issuer in a category of said issuers and for other said issuers also in the category, a plurality of Payments Transaction Power Scores between the one said issuer in the category of said issuers and the other said issuers in the category, wherein the plurality of Payments Transaction Power Scores include:
an average number of the transactions on the prepaid accounts per the number of the issued prepaid accounts; and
an average currency amount of the transactions on the prepaid accounts per the number of the issued prepaid accounts; and
rendering a report graphically depicting the plurality of Payments Transaction Power Scores.

19. A method comprising a plurality of steps each being performed by hardware executing software, wherein the steps include:
accumulating data via a computer from a plurality of transactions each of which is conducted on a corresponding issued prepaid account issued by an issuer that was activated by an account holder, wherein the issuer is within a payment processing system that includes a transaction handler processing the transaction for both a merchant and processing other said transactions for other said merchants, each said merchant submitting the corresponding said transaction to a corresponding acquirer for processing by the transaction handler who requests the issuer of the corresponding said prepaid account to obtain payment for the corresponding said transaction from the corresponding said prepaid account and for which the issuer forwards the payment from the prepaid account to the transaction handler who forwards the payment to the acquirer to pay the merchant for the corresponding said transaction;

calculating via a computer, from the accumulated data for both one said issuer in a category of said issuers and for other said issuers also in the category, a plurality of Payments Transaction Power Scores between the one said issuer in the category of said issuers and the other said issuers in the category, wherein the plurality of Payments Transaction Power Scores include:
- a percentage of the activated prepaid accounts per the issued prepaid accounts;
- an average number of the transactions on the prepaid accounts;
- a product of:
  - the percentage of the activated prepaid accounts per the issued prepaid accounts; and
  - the average number of the transactions on the prepaid accounts; an average currency amount of the transactions on the prepaid accounts;

and
- a product of:
  - the percentage of the activated prepaid accounts per the issued prepaid accounts;
  - the average number of the transactions on the prepaid accounts; and
  - the average currency amount of the transactions on the prepaid accounts;

and
- rendering a report graphically via a computer depicting the plurality of Payments Transaction Power Scores.

20. A non-transitory computer-readable medium comprising a set of instructions that cause a computer to perform the method of:

accumulating data via a computer from a plurality of transactions each of which is conducted on a corresponding issued prepaid account issued by an issuer that was activated by an account holder, wherein the issuer is within a payment processing system that includes a transaction handler processing the transaction for both a merchant and processing other said transactions for other said merchants, each said merchant submitting the corresponding said transaction to a corresponding acquirer for processing by the transaction handler who requests the issuer of the corresponding said prepaid account to obtain payment for the corresponding said transaction from the corresponding said prepaid account and for which the issuer forwards the payment from the prepaid account to the transaction handler who forwards the payment to the acquirer to pay the merchant for the corresponding said transaction;

calculating via a computer, from the accumulated data for both one said issuer in a category of said issuers and for other said issuers also in the category, a plurality of Payments Transaction Power Scores between the one said issuer in the category of said issuers and the other said issuers in the category, wherein the plurality of Payments Transaction Power Scores include:
- a percentage of the activated prepaid accounts per the issued prepaid accounts;
- an average number of the transactions on the prepaid accounts; a product of:
  - the percentage of the activated prepaid accounts per the issued prepaid accounts; and
  - the average number of the transactions on the prepaid accounts; an average currency amount of the transactions on the prepaid accounts; and
- a product of:
  - the percentage of the activated prepaid accounts per the issued prepaid accounts;
  - the average number of the transactions on the prepaid accounts; and the average currency amount of the transactions on the prepaid accounts; and rendering a report graphically via a computer depicting the plurality of Payments Transaction Power Scores.

* * * * *